US012769180B2

(12) United States Patent
Brodie et al.

(10) Patent No.: US 12,769,180 B2
(45) Date of Patent: Oct. 20, 2026

(54) ELECTRICAL FLEXURE COMPONENT, SEPARATE FROM SUSPENSION, FOR SENSOR SHIFT CAMERAS

(71) Applicant: Apple Inc., Cupertino, CA (US)

(72) Inventors: Douglas S Brodie, San Jose, CA (US); Scott W Miller, Los Gatos, CA (US); Steven Webster, Singapore (SG)

(73) Assignee: Apple Inc., Cupertino, CA (US)

( * ) Notice: Subject to any disclaimer, the term of this patent is extended or adjusted under 35 U.S.C. 154(b) by 161 days.

(21) Appl. No.: 18/770,526

(22) Filed: Jul. 11, 2024

(65) Prior Publication Data

US 2026/0186371 A1 Jul. 2, 2026

(51) Int. Cl.
*H04N 5/335* (2011.01)
*G03B 5/00* (2021.01)
(Continued)

(52) U.S. Cl.
CPC ............... *G03B 5/00* (2013.01); *G03B 13/36* (2013.01); *H02K 41/0356* (2013.01); *G03B 2205/0069* (2013.01); *H02K 2201/18* (2013.01)

(58) Field of Classification Search
CPC ....................................................... G03B 5/00
See application file for complete search history.

(56) References Cited

U.S. PATENT DOCUMENTS 9,766,426 B2 9/2017 Lam
10,244,171 B2 3/2019 Ng
(Continued)

FOREIGN PATENT DOCUMENTS

CN 112087558 12/2020
CN 113840054 12/2021
(Continued)

OTHER PUBLICATIONS

"Our Products," MEMSDrive, downlaoded from memsdrive.com/m/list.php?tid=7, (c) 2012-2020 MEMSDrive, pp. 1-3.
(Continued)

*Primary Examiner* — Gary C Vieaux
(74) *Attorney, Agent, or Firm* — Robert C. Kowert; Kowert, Hood, Munyon, Rankin & Goetzel, P.C.

(57) ABSTRACT

Flexure component(s), including arms physically separate from suspension flexures, in a sensor-shift camera, route power to and/or high-speed data produced by an image sensor, reducing complexity of the suspension. A camera includes a static portion (e.g., a base or non-moving portion of a platform of the camera) attached to one side of flexure component(s). The moving portion (e.g., a moving platform that supports an image sensor, or the lenses) is attached to the other side of the flexure component(s). The one or more flexible electrical flexure component(s) may route power, image data signals, and/or control signals between the static and a moving portion of the camera. In embodiments, a suspension (e.g., a flexure-based suspension, physically distinct from the flexible electrical flexure component(s)) acts to moveably connect the static portion and the moveable portion while an actuator moves the moveable platform (e.g., for image stabilization or autofocus).

20 Claims, 17 Drawing Sheets

(51) Int. Cl.
*G03B 13/36* (2021.01)
*H02K 41/035* (2006.01)

(56) References Cited

U.S. PATENT DOCUMENTS

| | | | | |
|---|---|---|---|---|
| 10,442,680 | B2 | 10/2019 | Liu | |
| 10,516,348 | B2 | 12/2019 | Liu | |
| 11,215,789 | B2 | 1/2022 | Park et al. | |
| 11,258,951 | B2 | 2/2022 | Platner et al. | |
| 11,277,565 | B2 | 3/2022 | Le et al. | |
| 11,389,704 | B2 | 7/2022 | Chamberi et al. | |
| 11,407,634 | B2 | 8/2022 | Ng | |
| 11,516,394 | B2 | 11/2022 | Johnson | |
| 11,575,835 | B2 * | 2/2023 | Xu | H04N 23/687 |
| 11,708,263 | B2 | 7/2023 | Ba-Tis | |
| 11,792,516 | B1 | 10/2023 | Patel et al. | |
| 12,284,443 | B2 * | 4/2025 | Jang | H04N 23/54 |
| 12,335,589 | B2 * | 6/2025 | Park | H02K 41/031 |
| 2019/0141248 | A1 * | 5/2019 | Hubert | H02K 41/0356 |
| 2020/0314338 | A1 * | 10/2020 | Johnson | H04N 23/68 |
| 2021/0168289 | A1 | 6/2021 | Hubert | |
| 2021/0409604 | A1 | 12/2021 | Sharma | |
| 2022/0247931 | A1 | 8/2022 | Mahmoudzadeh et al. | |
| 2023/0056192 | A1 | 2/2023 | Patel | |
| 2023/0156334 | A1 * | 5/2023 | Jang | H01F 7/20 348/208.7 |
| 2023/0185105 | A1 | 6/2023 | Mireault | |
| 2023/0199313 | A1 | 6/2023 | Hubert | |
| 2023/0296961 | A1 | 9/2023 | Brown | |
| 2025/0097578 | A1 | 3/2025 | Hu | |

FOREIGN PATENT DOCUMENTS

| | | |
|---|---|---|
| CN | 114265165 | 4/2022 |
| CN | 117857906 | 4/2024 |

OTHER PUBLICATIONS

Tis, Faez Saleh Ahmed Ba., "Three-degrees-of-freedom MEMS Electrostatic Out-of-Plane Comb-Drive Actuator for Auto-focus and Image Stabilization in Phone Cameras," https://library-archives.canada.ca/eng/services/services-libraries/theses/Pages/item.aspx?idNumber=1033008839, 2014, pp. 1-93.

U.S. Appl. No. 18/611,614, filed Mar. 20, 2024, Scott W. Miller, et al.

* cited by examiner

ELECTRICAL FLEXURE COMPONENT, SEPARATE FROM SUSPENSION, FOR SENSOR SHIFT CAMERAS

BACKGROUND

Technical Field

This disclosure relates generally to a camera and more specifically to structures designed to separate electrical signal and/or power routing from suspension functionality for moveable portions of a camera (e.g., movement supporting optical image stabilization (OIS), autofocus (AF), or other movement-related functionality).

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. Some cameras may include delicate, moveable components to provide desired image capturing functions and qualities.

For example, optical image stabilization and autofocus features are often implemented via mechanical features that move in relation to other features in the camera. Camera components supportive of features such as these are intended to move (e.g., via a mixture of suspension, sensor, and control features and the like) in order to provide their associated functionality. Providing electrical connections between the moving and non-moving parts of the camera can be a challenge. For example, it can be a challenge to provide sufficient signal-carrying capacity for carrying all of the signal data produced by an (moving) image sensor to a non-moving processor to process the image data.

Additionally, providing power and ground to moving components such as the image sensor, and/or control signals to VCM actuator coils can also be challenging.

Figure 1A:
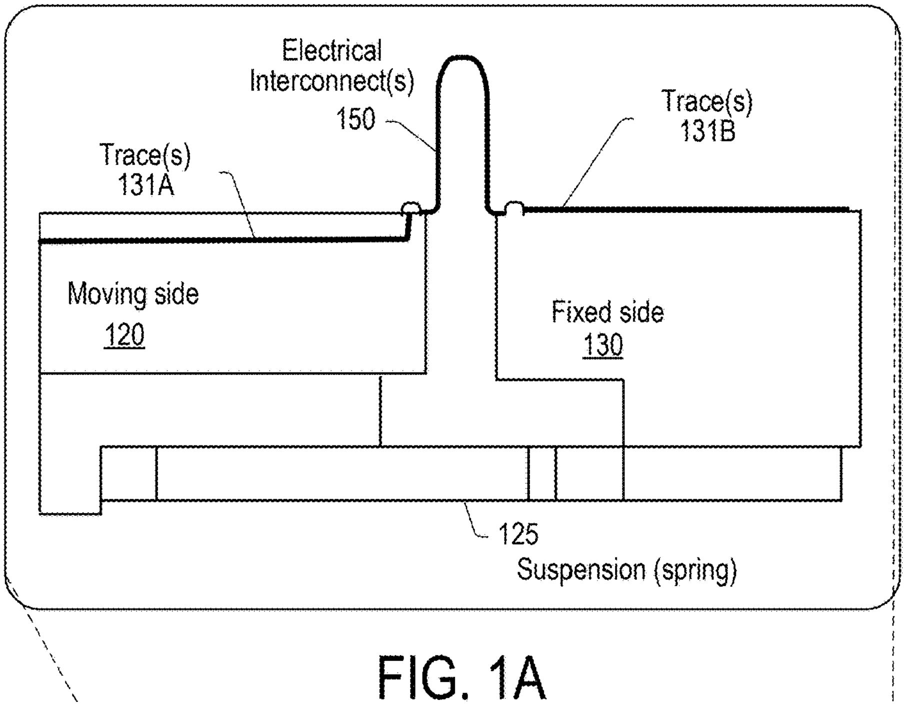
FIGS. 1A-1B show example components of dynamic electrical interconnects with separate suspension for sensor shift cameras, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to dynamic electrical interconnects and/or flexure components that are separate from a suspension for sensor shift cameras. In embodiments, a camera (having one or more lenses) includes a static portion (e.g., a base or non-moving portion of a platform of the camera) attached to one side of a set of flexible electrical interconnects or a flexure component. A moving portion (e.g., a moving platform that supports an image sensor, or the lenses) is attached to the other side of the flexible electrical interconnects or the flexure component. The flexible electrical interconnects (or flexure component) may route power, image data signals, and/or control signals between the static and a moving portion of the camera. In embodiments, a suspension (e.g., a flexure-based suspension, physically distinct from the flexible electrical interconnects and/or separate from the flexure component, in embodiments) acts to moveably connect the static portion and the moveable portion while an actuator moves the moveable platform (e.g., for image stabilization or autofocus).

Disclosed herein are various embodiments. A first set of embodiments, illustrating electrical interconnections 150 (e.g., FIGS. 1A/B-7), and a second set of embodiments, illustrating a flexure component 810 (e.g., FIGS. 8-12). It is contemplated that at least some devices may use the electrical interconnections, the flexure component, or both together, without departing from the scope of the disclosure.

In some camera architectures (e.g., illustrated in FIGS. 2A, 2B, described below) electrical signals and/or power may be routed over electrical traces formed on parts of the suspension between the static and moving portions. Some such architectures require a greater number of suspension pieces (e.g. flexures) between the moving and static portions in order to have enough traces to route the large amount of high-speed data produced by the image sensor or for other types of electrical connections. The greater number of flexures requires either an increase in the overall X-Y footprint of this part of the camera (given a same size image sensor), or reduces the X-Y area available for an image sensor. An architecture that does not require the greater number of flexures has the benefit of reducing the overall X-Y footprint of this part of the camera, or making a greater amount of X-Y area available for an image sensor.

In embodiments, separation of the suspension functionality from the electrical connection functionality reduces or even minimizes the number of suspension flexures needed to support the moving portions of the camera. In embodiments, an architecture segregates the suspension functionality from the electrical connection functionality such that the suspension carries no (or a low number of) electrical signals and electrical interconnects (separate components from the suspension that conduct electricity) between the static and moving portions of the camera contribute only negligible stiffness to the overall architecture, compared to the suspension.

In an example embodiment, a metallic spring provides mechanical support for the suspension (e.g., X and Y directions are relatively low stiffness while the Z-direction stiffness is much higher) and electrical interconnects (e.g., high-compliance metallic interconnects) or a flexure component is used for electrical power and signal transmission between static and moving portions.

In embodiments, a camera (having one or more lenses) is divided into a static portion that does not move and one or more moveable portions. In embodiments, various types of electrical signals are routed between the static portion and the moveable portion(s). The electrical signals may be routed by various flexible electrical interconnects (or via arms of a flexure component). For example, one side of the flexible electrical interconnects may be attached to the moveable platform and the other side of the flexible electrical interconnects may be attached to the static portion, such that electrical signals can be transported over the flexible electrical interconnects between the static portion and the moveable platform. In embodiments, the moveable platform is attached to an image sensor that receives light refracted by the one or more lenses and produces high speed image data signals that are sent over one or more of the flexible electrical interconnects.

In embodiments, the camera includes a flexure-based suspension, physically separate from the flexible electrical interconnects, between the static portion and the moveable platform. In embodiments, a flexure is a component that is intentionally flexible in at least one dimension while intentionally inflexible in one or more other dimensions. In embodiments, the electrical interconnects are characteristically different from the suspension flexures in that the electrical interconnects are flexible (or negligibly stiff with respect to the suspension flexures) in X, Y and Z directions, while the suspension flexures are relatively stiff in one or more of the directions. The camera may include one or more VCM actuators that move the moveable platform (e.g., for image stabilization or otherwise) in the directions made flexible by the suspension components.

In embodiments, material choice and cross section of the suspension spring may target a greatest amount of movement in X-Y dimensions (e.g., described in terms of aspect ratio: the spring is narrow in X-Y dimensions) but also target a least amount of movement (highest stiffness) in all other degrees of freedom (e.g., the spring is larger in the Z dimension) such as for tip, tilt, and rotation, for example.

Various different types of cameras move the moveable platform (e.g., holding the image sensor) in various different directions. For example, a camera with optical image stabilization in the X and Y dimensions may include one or more actuators that move the moveable platform in the X and Y dimensions. Another type of camera may include actuators that move the moveable platform in the X, Y, and Z dimensions (e.g., translating the image sensor in X, Y, and Z dimensions of three-dimensional space). In embodiments, various architectures of a camera may include various components (e.g., suspensions, actuators, etc.) that allow the image sensor to be moved in any degree (a single degree of freedom on an image sensor is controlled by the up/down, forward/back, left/right, pitch, roll, or yaw) or any combination of degrees, up to and possibly including, all of 6 degrees of freedom in 3D space (either translating linearly or rotating axially). In embodiments, the flexible electrical interconnects may be used in any such architectures, to facilitate sending electrical power and/or electrical signals between stationary and moving components, and/or between two moving components.

In embodiments described herein, a camera may include one or more lenses (e.g., various arrangements of lenses having power, folded optics, etc.) that produce light along an optical axis. The camera may include a moveable image sensor platform that supports an image sensor that receives light refracted by the one or more lenses. In embodiments, the camera may include one or more actuators (e.g., a voice coil motor or other type of actuator). Various of the actuators may move the image sensor in one or more directions parallel to an image plane at the image sensor for image stabilization and/or in one or more directions perpendicular to the image plane at the image sensor for autofocus (AF), for example.

In embodiments, the camera may include various controllers (e.g., OIS controller/AF controller) that control corresponding actuators. For example, a VCM actuator, including one or more coils and magnets, may be controlled to move the image sensor in one or more optical image stabilization directions in response to control signals from the OIS controller. In some such embodiments, the one or more first magnets, second magnets and/or third magnets are distinct from the magnets of the VCM actuator.

In some embodiments, the camera may include an autofocus (AF) function whereby the object focal distance between the optical components and the image sensor may be adjusted, e.g., along an optical axis of the optical components. In addition, in some embodiments, the camera may include an optical image stabilization (OIS) function that may sense and react to external excitation or disturbance by adjusting the relative position between the image sensor and the optical components, e.g., in one or more directions orthogonal to the optical axis. In some embodiments, the AF and/or OIS functions may be implemented using a sensor-shift design, using which the image sensor may be movable relative to the optical components in the foregoing directions. In some embodiments, the sensor-shift design may include a “floating” image sensor mounting structure that may suspend the image sensor from another stationary component of the camera, thus providing degrees of motion freedom for the image sensor. In addition, the motion of the image sensor may be controlled using one or more actuators, e.g., one or more voice coil motor (VCM) actuators.

In embodiments, multiple ones of the flexible electrical interconnects are physically separate from one another and each one of the multiple flexible electrical interconnects provides a single electrical connection. Such embodiments may provide significant benefits over ribbon-like or bus-based cable with multiple electrical traces where multiple electrical traces are packaged together, and move together as a ribbon. For example, ribbon-like or bus-based electrical connections can be heavier than embodiments where multiple ones of the flexible electrical interconnects are physically separate from one another. In another example, ribbon-like or bus-based electrical connections can be more rigid than embodiments where multiple ones of the flexible electrical interconnects are physically separate from one another. Such rigidity can cause unwanted forces (in any or multiple directions) to be translated onto the moveable platform, in embodiments. For example, ribbon cables are generally less flexible (or not flexible) in the Y dimension, whereas the flexible electrical interconnects disclosed in some embodiments herein are flexible in all directions and provide little-to-no stiffness in any direction. Such flexible electrical interconnects allow for movement of the moveable platform to be more independent from the components providing the electrical connections than other architectures (e.g., architectures that use stiffer electrical connections). In embodiments, separating the suspension functionality from the electrical connection functionality (e.g., by using the flexible electrical connections, described herein) allows for stiffness of the moveable platform to be controlled based upon the suspension components, independent from the electrical connections. In embodiments, the elimination of, or reduction of, stiffness of the electrical connections has the benefit of more clearly separating the mechanical stiffness functionality (functionality better handled by suspension components in embodiments herein) from the electrical connection functionality (better handled by the flexible electrical connections, in embodiments herein).

Figure 1B:
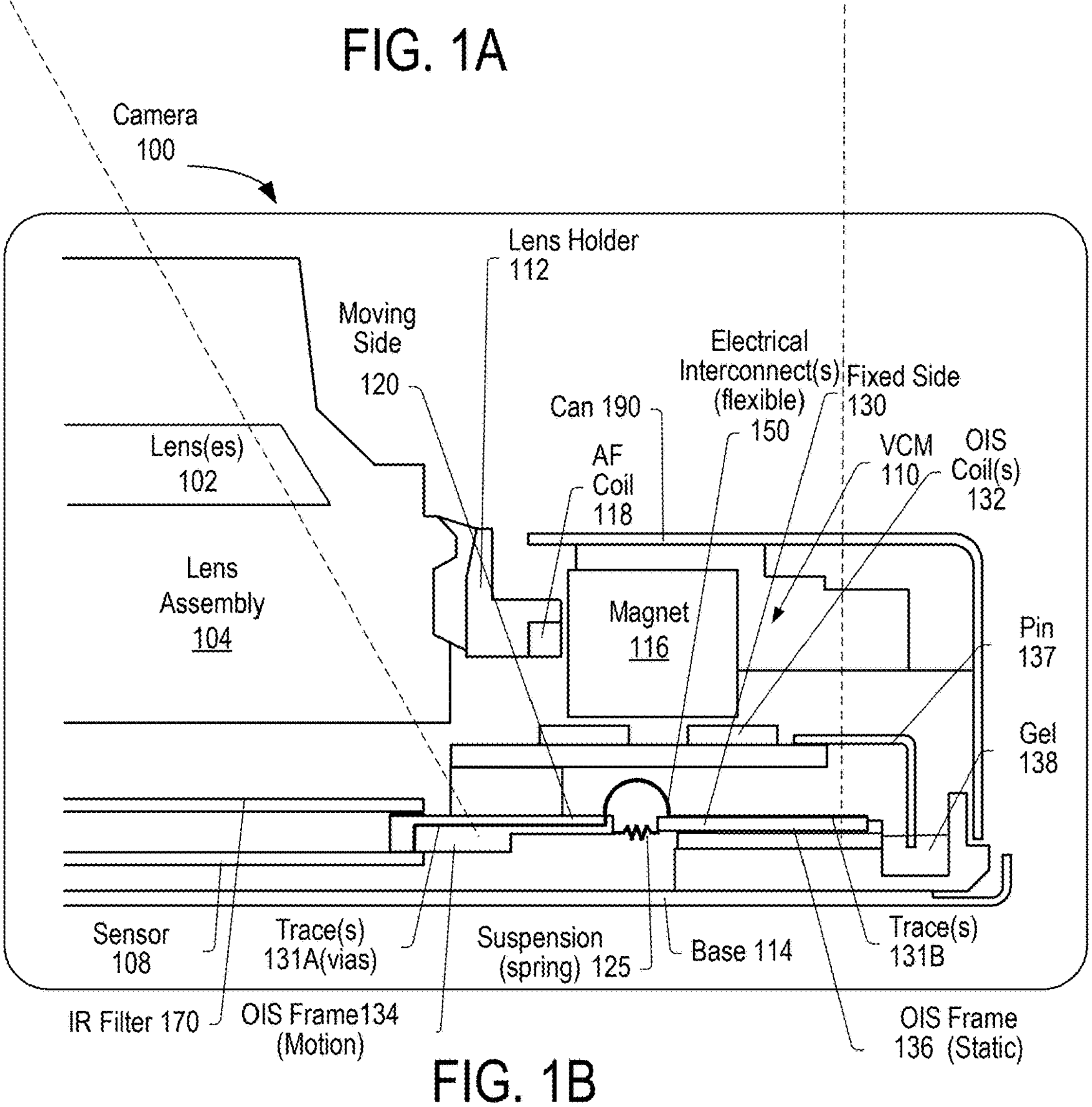

Attention is now brought to the FIGURES. Generally, FIGS. 1A, 3A, 3B, 4A-H, 5A, 5B, 6, 7, 8, 9, 10A-10E, 11 and 12 illustrate various components (such as interconnects or flexure components), one or more of which may be used in cameras 1B, 2A, and 2B, and various ones of the cameras may be found in devices, such as those illustrated in FIGS. 13 and 14. For example, suspension spring 125, along with electrical interconnect 150 in FIG. 1 are components useable in the architecture of camera 100 illustrated in FIG. 1B. Electrical interconnects 150 are also illustrated in various camera architectures illustrated in FIGS. 3A, 3B, 4A-H, 5A, 5B, 6 and 7. FIGS. 8, 9, 10A-10E, 11 and 12 illustrate embodiments of a flexure component. It is contemplated that architectures with fewer or additional features than those illustrated are possible and that various features disclosed herein may be combined in additional ways than the non-exhaustive examples provided herein.

FIGS. 1A-1B show example components of dynamic electrical interconnects with separate suspension for sensor shift cameras, according to some embodiments. In FIG. 1A, a more detailed view of a portion of FIG. 1B, illustrates that suspension spring 125 moveably connects fixed side 130 (e.g.,) with moving side 120. Electrical interconnect(s) 150 electrically connect trace(s) 131A of the moving side 120 with trace(s) 131B of the fixed side. It is contemplated that the electrical interconnect(s) 150 are flexible so as to maintain electrical connections between the traces even as the moving side moves (e.g., toward, away, or side-to-side with respect to fixed side 130) as allowed by suspension 125.

It is contemplated that the moving side 120 and the fixed side 130 may each comprise various components of the camera. For example, moving side 120 may include one or more components that move together, while fixed side may include one or more components that remain fixed during the movement of the moving side 120. In some embodiments, the fixed side may be fixed with regard to the movement of the moving side, but may move with regard to other components of the camera. For example, a platform attached to an image sensor may move (e.g., for OIS) with regard to an actuator magnet that is "fixed" with regard to movement of the platform, but the actuator magnet may be configured to move with regard to a base of the camera (e.g., for AF features or the like).

In embodiments, a moving side 120 of a camera may include an image sensor 108 (and/or IR filter 170) attached to an OIS frame or platform 134. In embodiments, the moving side 120 may include OIS coils 132 attached to the OIS frame or platform 134 (and/or features to damp motion, such as a pin 137 (in a gel damper 138) and or electrical traces 131A. In embodiments, moving side 120 may include components associated with autofocus, such as lens assembly 104, lens holder 112, and AF coil 118. Moving side 120 may include more, fewer, or different features, in embodiments. Fixed side 130 may include (e.g., for a fixed side for OIS motion) one or more components of the camera, comprising a camera base 114, OIS frame 136 (static) and/or traces 131B. In embodiments, fixed side 130 may include (e.g., for a fixed side for AF motion) magnet(s) 116, can 190, and substrate or the like attaching the magnet(s) 116 to the can or frame.

FIG. 1B illustrates a cross-section view of one half of camera 100. FIG. 1B illustrates camera 100 with lens(es) 102 in lens assembly 104 that is supported by lens holder 112. An outside cover or can 190 is illustrated as attached to a magnet 116 of a voice coil motor (VCM) 110 (e.g., VCM including a magnet and various coils for OIS or AF). The lower portion of FIG. 1B illustrates image sensor 108 (below IR filter 170), attached to OIS frame 134 (e.g., a moving portion or side 120, in embodiments) that is suspended via a flexure suspension 124 from base 114 (part of OIS static frame 136, in embodiments). Electrical interconnects (flexible) 150 are illustrated as a half-loop formed of a conductive material that connect traces 131A on a moving portion (e.g., OIS frame 134) with traces 131B on a static portion (e.g., OIS frame 136). Together, FIGS. 1A and 1B illustrate a combination of moveable (e.g., OIS frame 134 (motion) or moveable platform) and static portions (e.g., OIS frame 136 (static) and base 114) connected via electrical interconnects 150 that are physically separate from a suspension that suspends the moveable portion.

The illustrated flexure suspension is only one example. It is contemplated that other types of suspensions (such as but not limited to a sliding (bushing) suspension or rolling (bearing) suspension, etc.) may be utilized for the moving portion, in other embodiments.

Figure 2A:
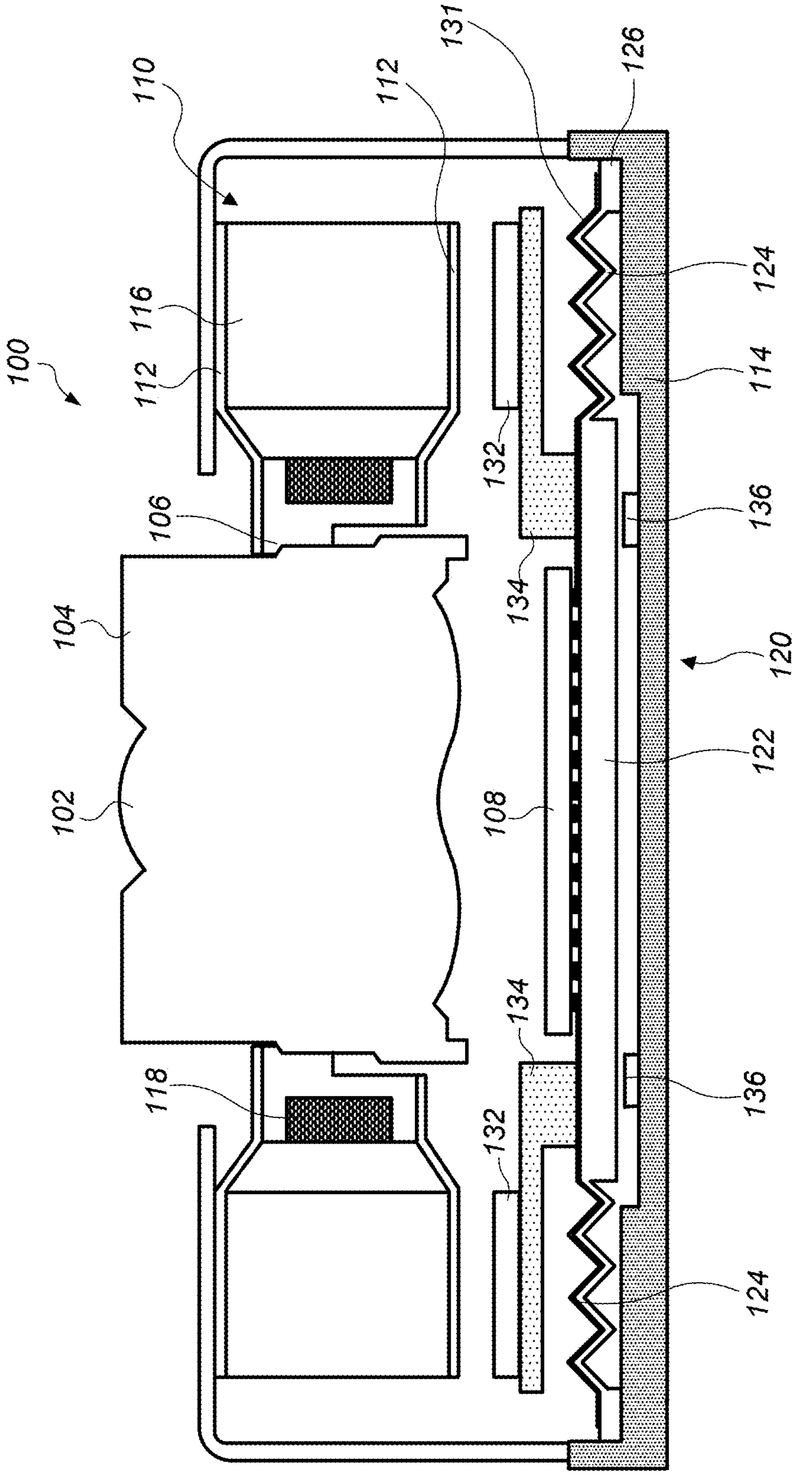
FIGS. 2A-2B show example components of an OIS architecture with electrical traces on flexure arms of a camera, according to some embodiments.
Figure 2B:
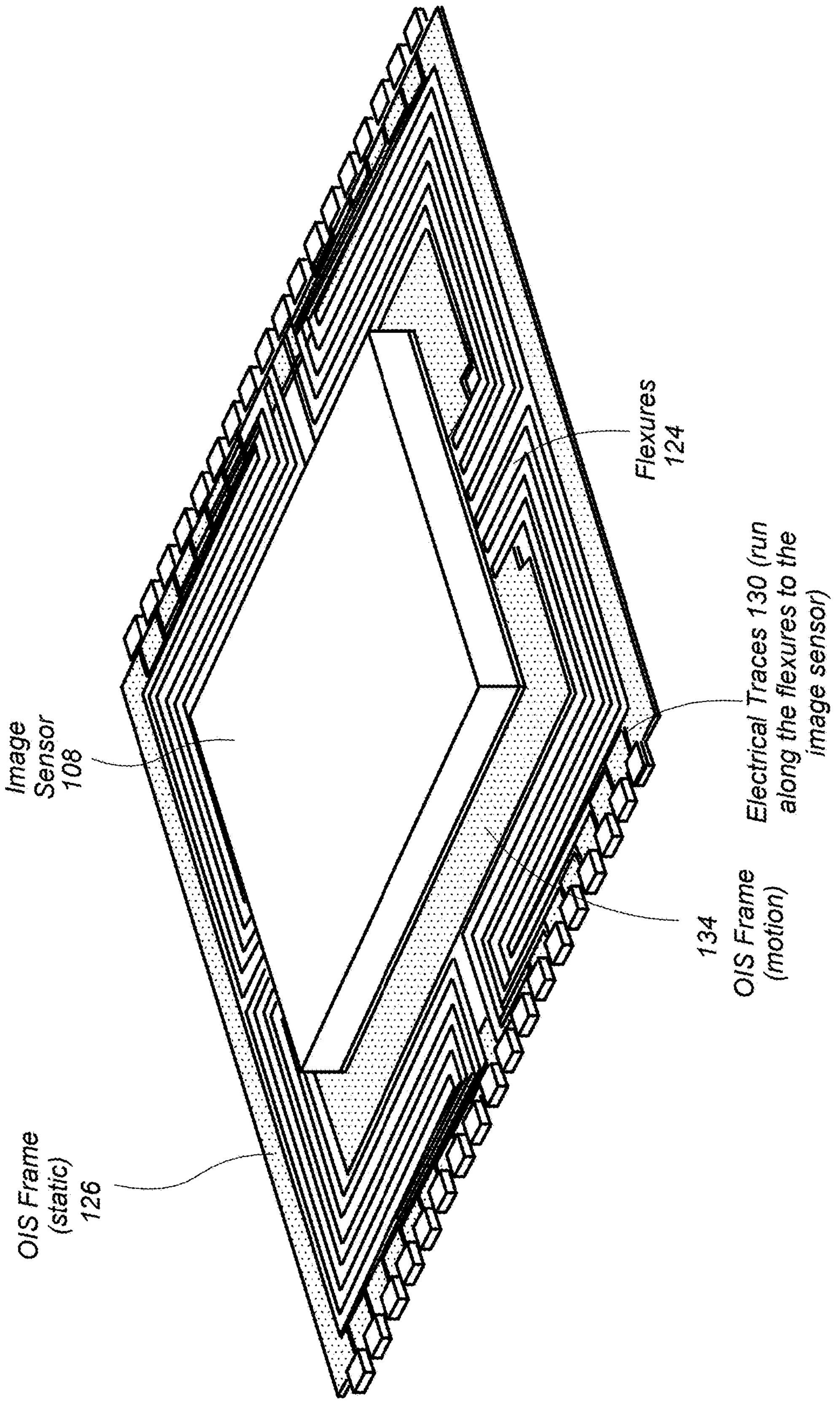

FIGS. 2A-2B show example components of an of an OIS architecture with electrical traces on flexure arms of a camera, according to some embodiments. FIG. 2A illustrates an example embodiment of a camera 100 having an actuator module or assembly that may, for example, be used to provide autofocus (AF) through lens assembly movement and optical image stabilization (OIS) through image sensor movement in small form factor cameras, according to at least some embodiments. In the embodiment illustrated in FIG. 2A, camera 100 includes a lens 102 inside a lens assembly 104 that is packaged in a lens carrier 106. In the embodiment illustrated in FIG. 2A, camera 100 includes an image sensor 108 for capturing a digital representation of light transiting the lens 102. In the embodiment illustrated in FIG. 2A, camera 100 includes an axial motion (autofocus) voice coil motor 110 for focusing light from the lens 102 on the image sensor 108 by moving a lens assembly 104 containing the lens 102 along an optical axis of the lens 102. In the embodiment illustrated in FIG. 2A, the axial motion voice coil motor 110 includes a suspension assembly 125 for moveably mounting the lens carrier 104 to an actuator base 114. In the embodiment illustrated in FIG. 2A, the axial motion voice coil motor 110 includes a plurality of shared magnets 116 mounted to the actuator base 114, and a focusing coil 118 fixedly mounted to the lens carrier 106 and mounted to the actuator base 114 through the suspension assembly 112.

In the embodiment illustrated in FIG. 2A, camera 100 includes a transverse motion voice coil motor 110. The transverse motion voice coil motor 110 includes an image sensor frame member 122, one or more flexible members 124 for mechanically connecting the image sensor frame member 122 to a frame of the transverse motion voice coil motor 110, and a plurality of transverse motion (OIS) coils 132 moveably mounted to the image sensor frame 134 member within the magnetic fields of the shared magnets 116, for producing forces for moving the image sensor frame member 134 in a plurality of directions orthogonal to the optical axis of the lens 102.

In some embodiments, the image sensor frame member 134, the one or more flexible members 124 or flexures for mechanically connecting the image sensor frame member 134 or dynamic platform to the frame of the transverse motion voice coil motor 110 or static platform, and the frame of the transverse motion voice coil motor 110 are a single metal part or other flexible part. In some embodiments, The flexible members 124 mechanically and electrically connect an image sensor 108 resting in the image sensor frame member 122 to a frame 126 of the transverse motion (optical image stabilization) voice coil motor 110, and the flexures include electrical signal traces 131. In some embodiments, flexible members 124 include metal flexure bodies carrying electrical signal traces 131 electrically isolated from the metal flexure bodies by polyamide insulator layers.

In some embodiments, the optical image stabilization coils 132 are mounted on a flexible printed circuit 134 carrying power to the coils 132 for operation of the (optical image stabilization) transverse motion voice coil motor 110. In the illustrated embodiment, a bearing surface end stop 136 (for bearing-based suspensions, in contrast to flexure-based suspensions) is mounted to the base 114 for restricting motion of the image sensor 108 along the optical axis.

FIG. 2B depicts an example embodiment of frames (OIS frame 134 (motion), OIS frame 126 (static)) and linkages (e.g., flexures 124 with electrical traces 13) of a camera having an actuator module or assembly that may, for example, be used to provide autofocus through lens assembly movement and optical image stabilization through image sensor movement in small form factor cameras, according to at least some embodiments. An image sensor 108 rests on a motion portion 134 of an OIS frame connected to a static portion 126 of the OIS frame by flexures 124 carrying electrical traces 131 (e.g., composed of copper deposition shielded by a polyimide layer). A difficulty associated with such an architecture of numerous weight-bearing flexures carrying electrical traces is that a large amount of high-speed data (e.g., image data) needs to be transmitted quickly from the image sensor 108 or the traces 131 and typical solutions have made use of a relatively greater number of traces to support the greater number tracers required to transmit the large amount of high-speed data in parallel from the image sensor 108. In order to provide the relatively large number of traces, the architecture must have a similar number of weight-bearing flexures (e.g., one electrical trace per flexure or similar). The relatively greater number of weight-bearing flexures causes the X-Y footprint of the overall architecture to expand, in order to accommodate all of the flexures required to carry the traces (or requires a smaller image sensor 108). Architectures with a smaller number of flexures (e.g., such as those illustrated in FIGS. 1A/1B, 3A/3B, 4A-H, 5A/5B, 6, and 7) have the benefit of a smaller overall footprint, compared to architectures that use flexures 124 carrying electrical traces 131 (e.g., FIGS. 2A/2B).

In some embodiments herein, a camera 100 (e.g., a camera similar to camera 100 in FIG. 1B or 2A) may include AF and/or OIS functions. To implement the AF and/or OIS functions, camera 100 may include a sensor-shift design with which image sensor 108 may be movable relative to the optical components (e.g., lenses 102) of camera 100. For instance, as indicated in FIG. 2A, image sensor 108 (mounted on a stiffener or otherwise) may be attached to substrate. In some embodiments, the stiffener may be made of substrate and may include one or more printed circuit boards (PCBs). In some embodiments, the OIS moving platform 122 may be suspended from a stationary structure (e.g., base 114) via a suspension structure 130. As a result, the substrate (and image sensor 108) may be "floated" relative to stationary structure (e.g., base 114 or from can 190) but also movable relative to the stationary structure (and the optical components such as lenses 102) approximately along the X and/or Y-axis. Further, camera 100 may include at least one actuator 110 and one or more coils 132. Camera 100 may conduct regulatable current through coils, which may interact with the one or more magnetic fields of magnets 116 to generate motive force (e.g., Lorentz force) to control the movement of image sensor 108. The movement of image sensor 108 relative to the optical components (e.g., lenses 102) in the X- and/or Y-axis may be used to implement an OIS function. In some embodiments, camera 100 may include one or more additional suspension structures and/or one or more additional actuators (not shown) that may allow image sensor 108 to move relative to the optical components approximately along the Z-axis to perform an AF function.

Figure 3A:
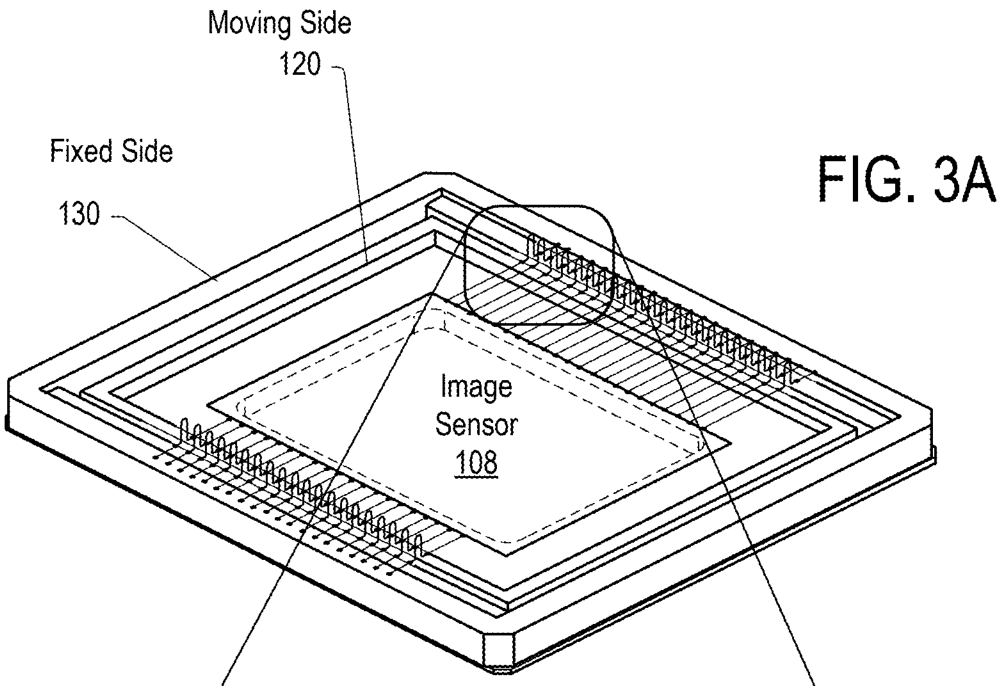
FIGS. 3A and 3B show electrical traces of a moving side and a fixed side of a camera, suitable for embodiments of dynamic electrical interconnects with separate suspension for sensor shift cameras, according to some embodiments.
Figure 3B:
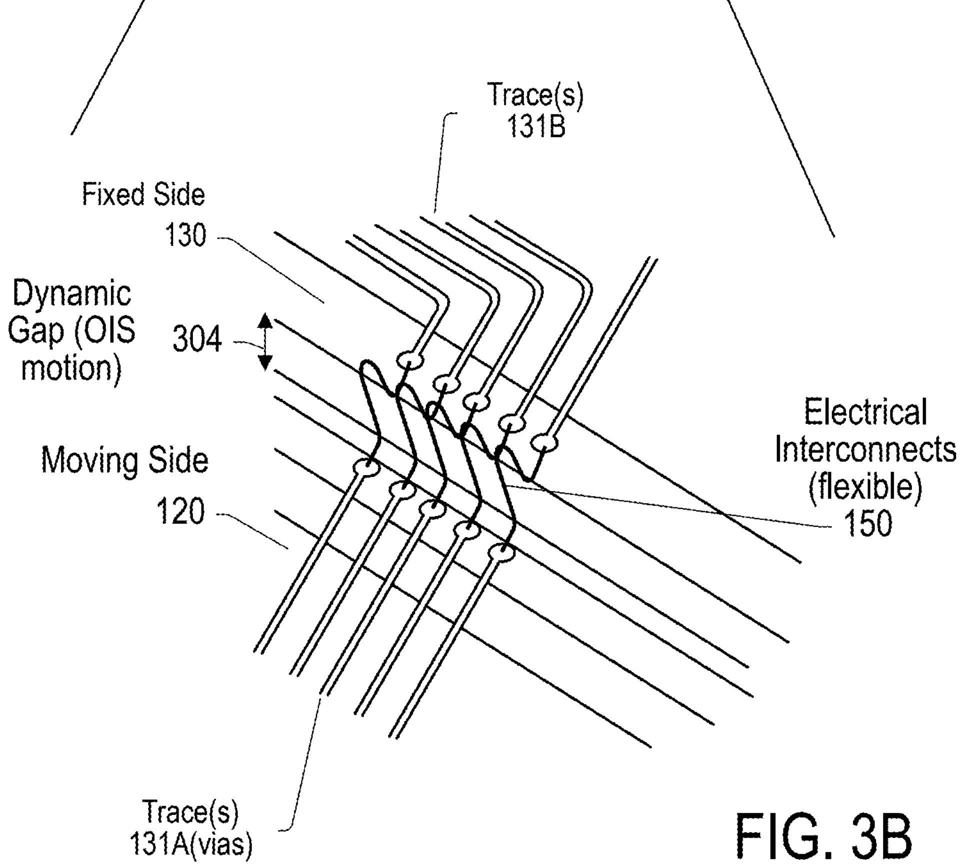

FIGS. 3A and 3B show electrical traces of a moving side 120 and a fixed side 130 of a camera, and multiple flexible electrical interconnects 150 therebetween, according to some embodiments. FIG. 3A illustrates a view of a moving platform 120 attached to an image sensor 108 and a fixed (or static) side 130. Suspension components are not illustrated in FIGS. 3A/3B (for clarity) but it is contemplated that various types of suspensions (flexure-based or ball-bearing-bases) could be used to support the moving side 120 movement. It is contemplated that the illustrated image sensor 108 (and moving side 120) could be supported by a suspension that allows the moving side 120 to move in the autofocus ("Z") direction, thereby providing autofocus functionality. FIG. 3B illustrates details of the components in FIG. 3A. The illustrated details include electrical traces 131A on or in (e.g., vias) the material forming the moving side 120 that is fixedly attached to the image sensor 108, as well as traces 131B on the fixed side 130. The traces of each side are connected by flexible electrical interconnects 150 that span a dynamic gap 304 that changes based on movement, such OIS movement induced by an OIS actuator.

In the illustrated embodiments, the electrical interconnects 150 (u-shaped loops, or similar) have a height in the Z dimension and a width in the X or Y dimension that spans the distance between where the electrical interconnects 150 are physically connected to the traces. In the illustrated embodiment, the electrical interconnects 150 are shaped (e.g., with an upward u-shaped or loop-shaped length) so as to reduce forces on the respective connections to a negligible amount (e.g., with respect to forces of the suspension components) when the moveable platform 120 moves in accordance with the suspension between the moveable platform 120 and the fixed side 130. In embodiments, the length of the electrical interconnects are long enough to reduce the force on the connections (and thereby the force on the respective moving or fixed component) to a negligible amount, but are also of a length the prevents physical interference of the electrical interconnects 150 with other components of the camera. It is contemplated that in some embodiments. Similar electrical interconnects 150 may be used, albeit placed in an upside-down position from that illustrated without departing from the scope of this disclosure.

FIGS. 3A, 3B illustrate an embodiment with multiple, individual electrical interconnects 150 that do not touch one another (e.g., non-conductive material of individual electrical interconnect threads are physically separate). For example, while each end of individual ones of the electrical interconnects is connected to a moving side or a fixed side, the individual electrical connectors remain physically separate from one another, free to move independently of one another. In embodiments, the physical independence of individual ones of the interconnects from the others reduces an amount of cross-talk between the electrical interconnects (e.g., compared to ribbon-based interconnect architectures where multiple conductive traces are contained in a single ribbon of non-conductive material, more closely together, and move together when any individual one is moved).

In embodiments, the electrical interconnects 150 route one or more signals from an image sensor. In embodiments, the electrical interconnects 150 route power and/or a ground connection (e.g., for the image sensor or otherwise). In embodiments, the electrical interconnects 150 route actuation signals to actuator coils of a VCM. In embodiments, the electrical interconnects 150 route data from one or more position sensors. Various combinations of these routing options are contemplated, without limitation.

FIGS. 4A-4H illustrate various non-limiting example loop shapes, sizes, and movements, as well as cross-sections of individual ones of the electrical interconnects for sensor shift cameras, according to some embodiments. In embodiments, individual ones of the electrical interconnects 150 use a high compliance metallic interconnect for electrical power and/or signal transmission. In embodiments, a dimension of a cross section of individual one of one or more of the flexible electrical interconnects is 1 to 9 microns.

Figure 4A:
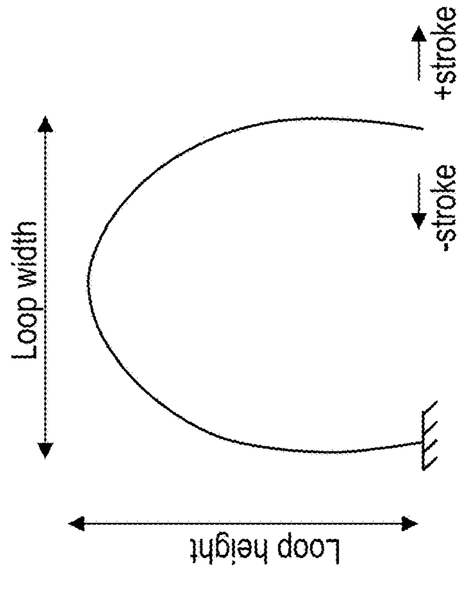
FIGS. 4A-4H illustrate various non-limiting example loop shapes, sizes, materials, and movements, as well as cross-sections of electrical interconnects for sensor shift cameras, according to some embodiments.

FIG. 4A illustrates an example loop shape for an electrical interconnect 150, in some embodiments herein. FIG. 4A illustrates an example loop height and a loop width that are approximately equal. It is contemplated that in some embodiments, the loop height (e.g., a distance from an attachment point of the loop to the top of the loop) is greater than a loop width (e.g., a distance measured at a widest point of the loop, sometimes at or near-to a mid-point of the loop height). In embodiments, loop height may be less than 1 millimeter. In some embodiments, a preferred loop height is less than 0.5 millimeter. In some embodiments, the loop width is less than 0.5 millimeter In embodiments, a preferred loop width is less than 0.25 millimeter. Height may be may be less than or greater than the loop width, in various embodiments.

Figure 4B:
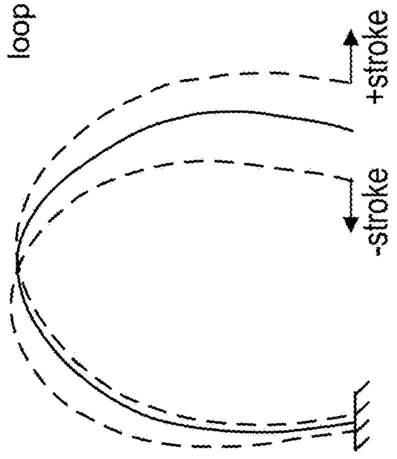

FIG. 4B illustrates a fixed portion (on the left) and a moving portion (on the right) with stroke in positive and negative direction (e.g., in accordance with OIS movement caused by an OIS actuator).

Figure 4C:
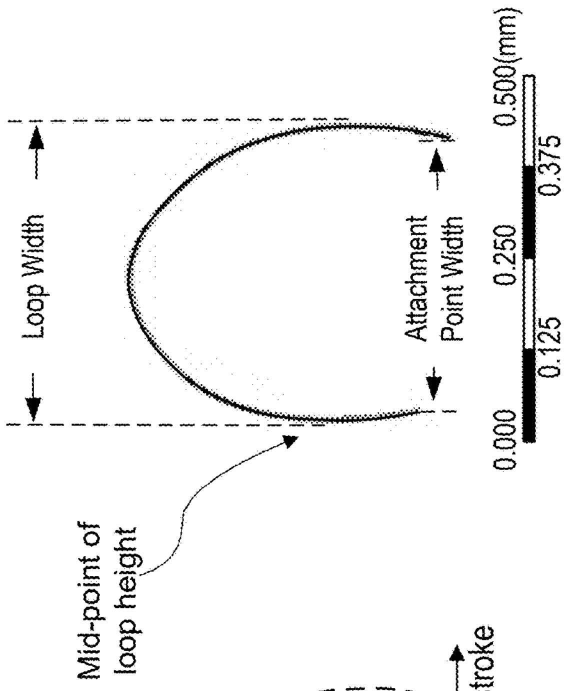
Figure 4D:
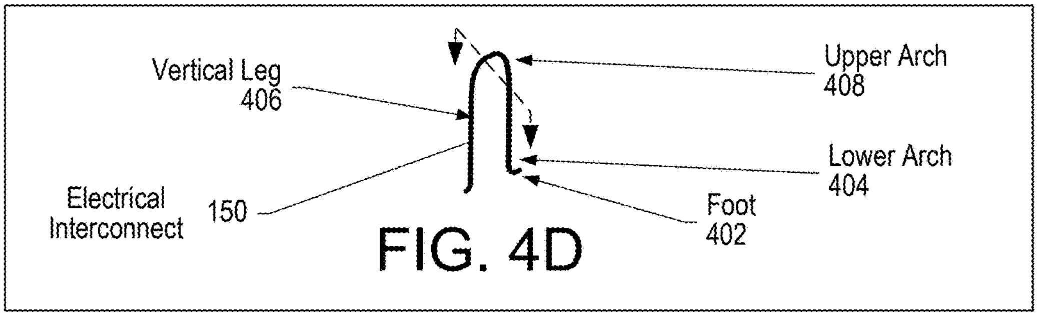

FIG. 4C illustrates example, non-exhaustive dimensions of a loop of an electrical interconnect 150. FIG. 4C illustrates a loop having a width less than 0.5 mm and having a height less than 0.5 mm. In embodiments, electrical interconnects 150 are created and attached to respective portions of the camera so as to perform, in at least the amount of stroke distance illustrated in FIG. 4B, (e.g., using the same scale illustrated in FIG. 4C) while placing a negligible amount of force (e.g., with respect to forces experienced by the suspension) on the attachment points to the components. For example, most, if not all of the force provided by an actuator to move a moveable portion may be translated into movement of the moveable portion and any resistance attributed to the," suspension, with only a negligible amount, if any, of the actuator force going towards causing the electrical interconnects 150 to flex, during the movement.

In FIGS. 4A, 4B, 4C, the loop is illustrated with an overall loop width (e.g., measured at a point about halfway up the leg of the loop, or wherever the loop width is greatest) that is greater than a width measured at the attachment point (attachment point width). In some embodiments, the loops of the electrical interconnects 150 are formed such that the overall loop width (e.g., sometimes referred to as a diameter of the loop) bows out from the attachment points and is greater than a width measured at the attachment point when the corresponding moving and static portions are in a neutral position (e.g., when the moveable portion is not being moved by an OIS actuator).

In various embodiments, the cross section of the electrical interconnect 150 may be circular, square, or rectangular, as non-exhaustive examples. Conductor material for the electrical interconnect may be selected so the electrical connectors exhibit beneficial characteristics such as high electrical conductivity (e.g., gold silver, copper alloys, etc.) and multi-dimensional flexibility.

FIGS. 4D-4H illustrate various non-limiting example cross-sections of electrical interconnects 150. In embodiments, the length and/or arc of the u-shapes portion of the electrical interconnect may be more than is necessary to span the distance between the interconnects. For example, manufacturing processes for electrical interconnects between components in an entirely static environment may dictate a minimum length and arc of the electrical interconnects (in an architecture where the components do not move in relation to one another). In embodiments herein for a moveable component, the length of the electrical interconnect must not only span the distance between electrical connections to the respective components when in a neutral position, but also must take into account the maximum distance necessary when the moveable side has reached a maximum moveable distance away from the static side. In embodiments herein, not only does the length of the electrical interconnects also account for the maximum (and minimum) range of motion, but additional length is added to the electrical interconnects to reduce forces (increase flexibility of the electrical interconnects) on the connected components during movement. The properties of such electrical interconnects may be expressed as various characteristics, such-as-but-not-limited to shape, such as, a length and or an angle of the electrical interconnect vertical leg 406, a radius of the lower arch 404 (sometimes referred to as a foot radius), a radius of the upper arch 408, stroke of the movement, length of a foot 402, etc.

For example, in embodiments, the length of the vertical leg 406 of the electrical interconnect may be formed so as to be extended to a greater degree than is necessary to account for the maximum distance necessary when the moveable side has reached a maximum moveable distance away from the static side. In embodiments, the electrical interconnect may be formed such that the vertical leg portion 406 is vertical (or greater than vertical, as illustrated in FIGS. 4A-4C) to the surface to which it is attached (or perpendicular to an image plane of the image sensor). In FIGS. 4A-4C, the length of the leg of the interconnect is extended, and the loop is formed) such that an angle of the leg (with respect to a horizontal plane at the base of the electrical interconnect) is greater than a 90-degree angle. Said another way, the shape of the loop formed by the electrical interconnect leaves the attachment point at an angle such that the beginning portion of the electrical interconnect extends back in the direction towards the portion of the camera component to which the electrical interconnect 150 is attached before changing direction and bending towards the other end of the electrical interconnect 150.

In embodiments, the electrical interconnects may be formed (e.g., of material and/or in a shape) to have particular physical properties. In embodiments, the electrical interconnects may exhibit an X-Y stiffness per conductor less than 2 mN/mm. Z-stiffness may be similar or different, in various embodiments. It is contemplated that stress for operation in the X-Y motion must be less than the allowable fatigue stress of the material for the product lifecycle (e.g., lifecycle of the camera/device).

In another example, X-Y stiffness of the electrical interconnects may be tailored to be less than 20 Newton-meters (Nm)/mm total for all electrical interconnects in parallel. In some embodiments X-Y stiffness of the electrical interconnects may be tailored to be less than 5 newton-meters (Nm)/mm total for all electrical interconnects in parallel. In some embodiments (e.g., wherein image sensors move in a Z direction) Z-stiffness will also be low by design. In some embodiments, Z-stiffness is not a driving design factor (e.g., where OIS movement is limited to the X-Y dimensions).

In embodiments, the electrical interconnects 150 may be formed (e.g., of material and/or in a shape) such that strains placed on the electrical interconnects 150 are well below a yield point. In embodiments, the electrical interconnects 150 may be formed so as to reduce strain experienced during movement of the moving side to a point where there is no signs of fatigue seen during testing or expected use during a product lifecycle.

In embodiments, the electrical interconnects 150 may be formed to have physical properties, such as, but-not-limited-to high electrical conductivity and good fatigue properties. In embodiments, the electrical interconnects may be formed with a dielectric layer. Non-limiting example material for forming electrical interconnects include copper alloy, although manufacturing processes may dictate a different material, in embodiments.

Figure 4E:
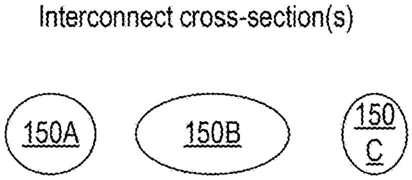
Figure 4F:
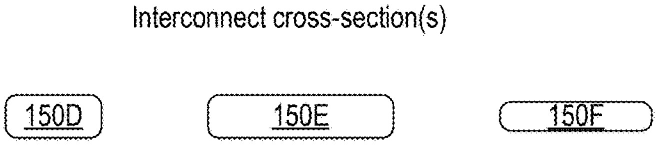
Figure 4G:
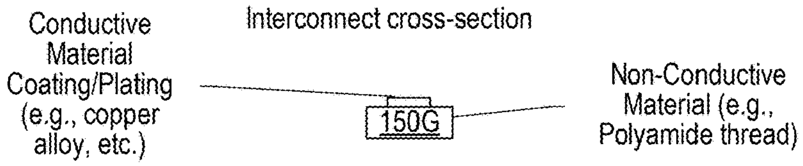
Figure 4H:
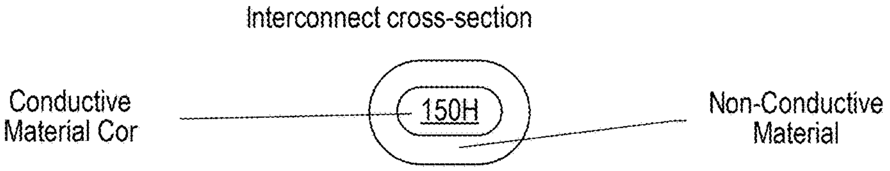

FIG. 4E illustrates non-exhaustive example shapes of cross-sections of electrical interconnects 150A (round), 150B (wide oval), 150C (tall oval). FIG. 4F illustrates non-exhaustive example shapes of cross-sections of electrical interconnects 150D (medium rectangular), 150E (tall, wide rectangular), 150F (short/wide rectangular). FIG. 4G illustrates an example shape of a cross-section of electrical interconnect 150G formed of a single trace of conductive material (e.g., a coating/plating such as a copper alloy or similar) layered on a non-conductive material (e.g., a polyamide base or thread). FIG. 4H illustrates an example shape of a cross-section of electrical interconnect 150H, having a conductive material core (e.g., copper alloy) encapsulated by a non-conductive material outside layer (e.g., polyamide).

In embodiments, the electrical interconnects may be shaped and/or may be formed of materials that minimize an amount of stiffness of the electrical interconnects compared to stiffness of the suspension connecting the two components at respective ends of the electrical interconnects. While the electrical interconnects 150 are configured with enough stiffness to retain a spacing from one another, to stand upright, and/or to return to a former position when the moveable component returns to a former position after movement, the stiffness may be considered negligible when compared to a stiffness of the suspension (e.g., a stiffness in one or more directions, but not in other one or more directions, in some embodiments).

For example, in embodiments (e.g., where OIS is in the X and Y dimensions) both the suspension and the electrical interconnects may be flexible in the X and Y dimensions, but the suspension may be stiff in the Z direction, while the electrical interconnects remain flexible in the Z dimension (the electrical interconnects do not provide significant support, or other force, in the Z dimension compared to the support provided by the suspension in the Z dimension).

Figure 5A:
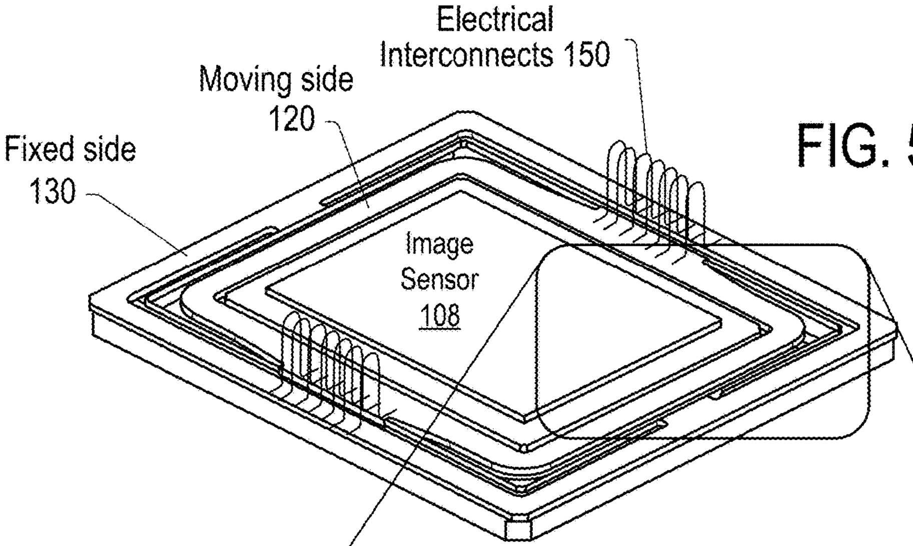
FIGS. 5A, 5B show example dynamic electrical interconnects with separate suspension architecture for sensor shift cameras, according to some embodiments.
Figure 5B:
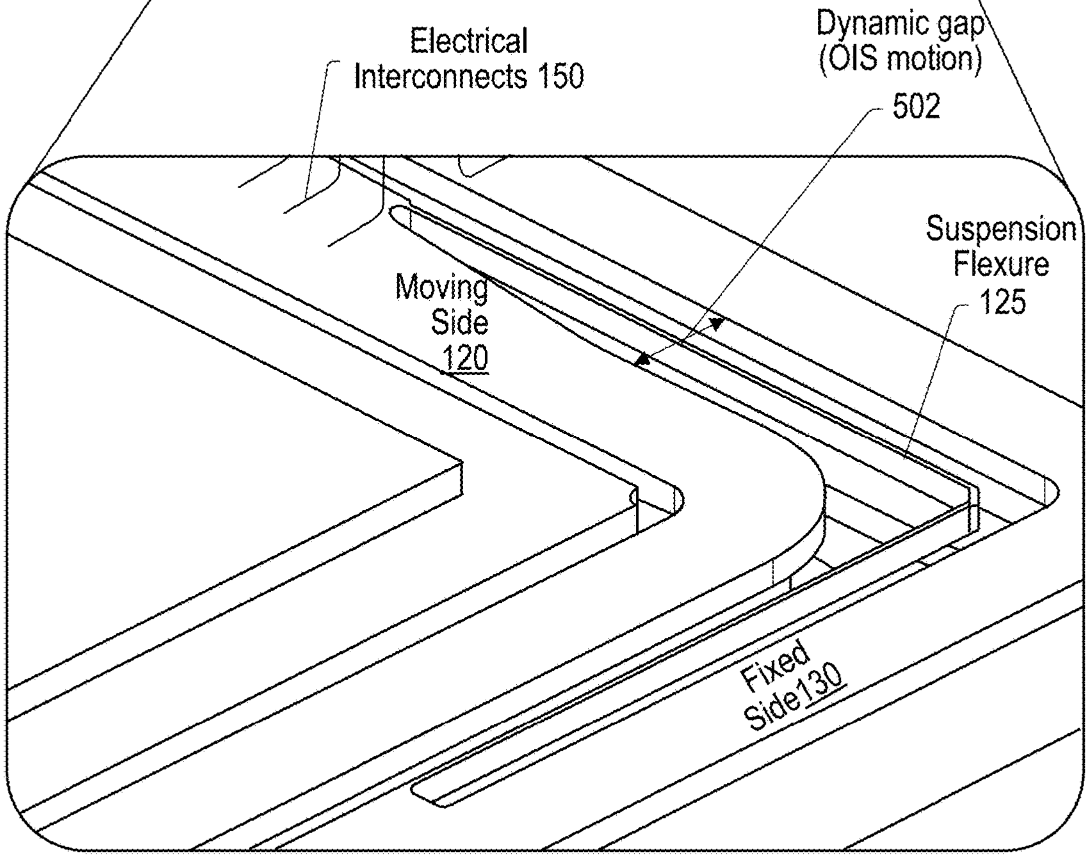

FIGS. 5A, 5B show example dynamic electrical interconnects 150 and suspension architecture for sensor shift cameras in example cameras, according to some embodiments. In the illustrated embodiment, fixed side 130 (e.g., a fixed side of a platform or a base structure or the like) physically supports moving side 120 via a single suspension flexure 125 at each of four corners of the device. Moving side 120 is illustrated as attached to an image sensor 108 that is electrically connected to traces on the fixed side 130 via electrical interconnects 150, physically separate and distinct from suspension flexure(s) 125. In the illustrated embodiments, components providing the functionality for supporting the physical motion (e.g., via the flexure-based suspension) is separated from the components providing the electrical connection functionality (the electrical interconnects 150). Such separation of functionality may reduce the complexity of the suspension (e.g., reduce the number of required flexures, thereby reducing a footprint of the related components) while still providing both types of functionalities. FIG. 5B illustrates a dynamic gap 502 between the fixed side 130 and the moving side 120.

Figure 6:
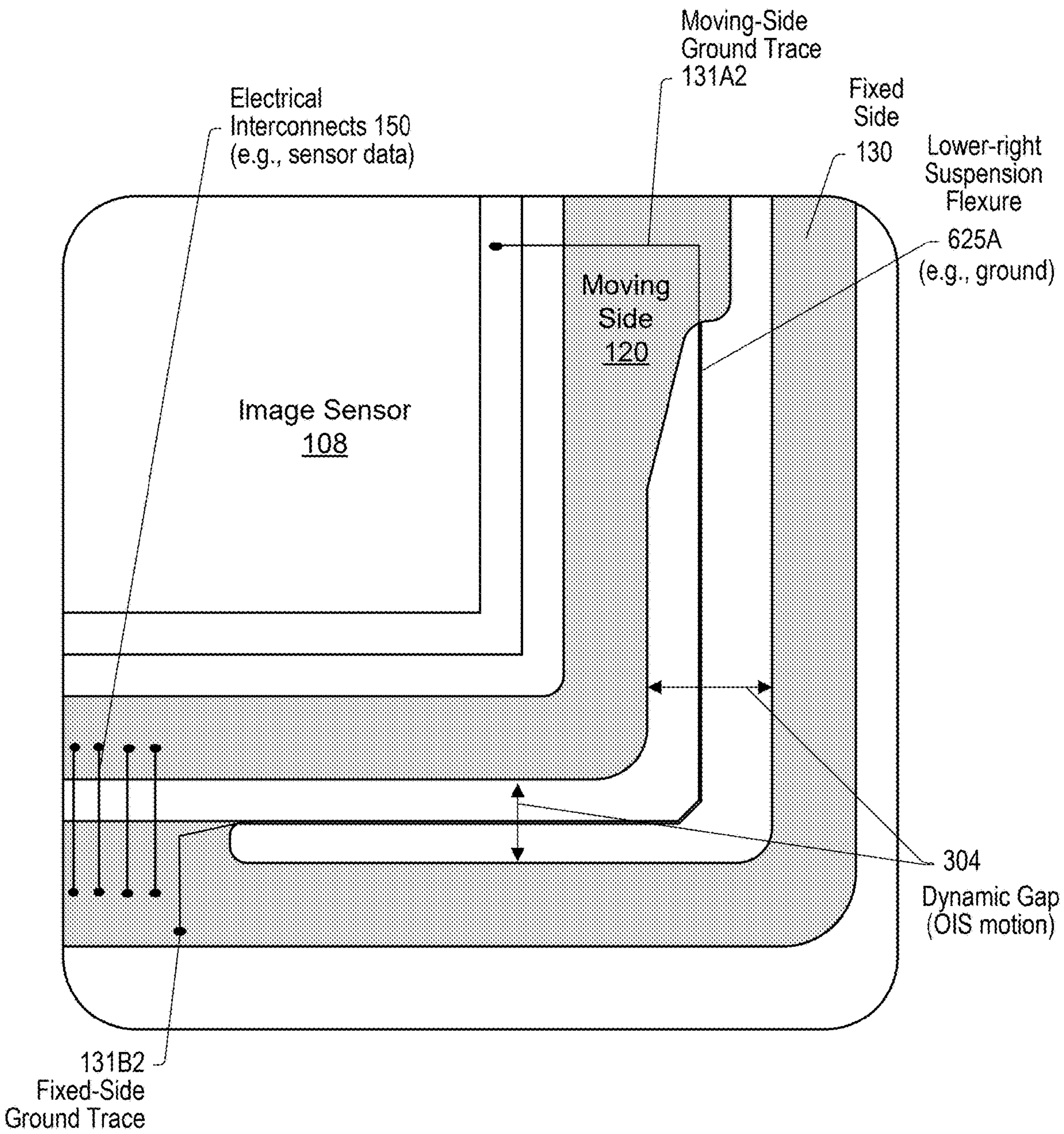
FIG. 6 shows example dynamic electrical interconnects with separate suspension architecture for sensor shift cameras, according to some embodiments.

FIG. 6 shows example dynamic electrical interconnects 150 and suspension architecture for sensor shift cameras in example cameras, according to some embodiments. FIG. 6 illustrates an architecture that, while similar to that in FIGS. 5A/5B illustrates a single flexure per each corner where one or more of the flexures carry a ground or power trace. FIG. 6 illustrates that an individual flexure in a single corner (e.g., lower-right suspension flexure 625A) may be used to route a ground electrical connection between fixed side 130 and moving side 120. It is contemplated that an individual flexure in a different corner (e.g., an upper-left suspension flexure, not illustrated) may be used to route power between fixed side 130 and moving side 120. The other two corners may be used to route actuator coil signals or position sensors, in embodiments. In some such embodiments, electrical interconnects 150 may route sensor data from the image sensor 108.

FIG. 6 illustrates image sensor 108 attached to moving side 120 with moving-side ground trace 131A2 connected to respective electrical connections routed over lower-right suspension flexure 625A (e.g., ground) to fixed-side ground trace 131B2. In the illustrated embodiment, the flexure spans a dynamic gap 304 (e.g., OIS movement).

Figure 7:
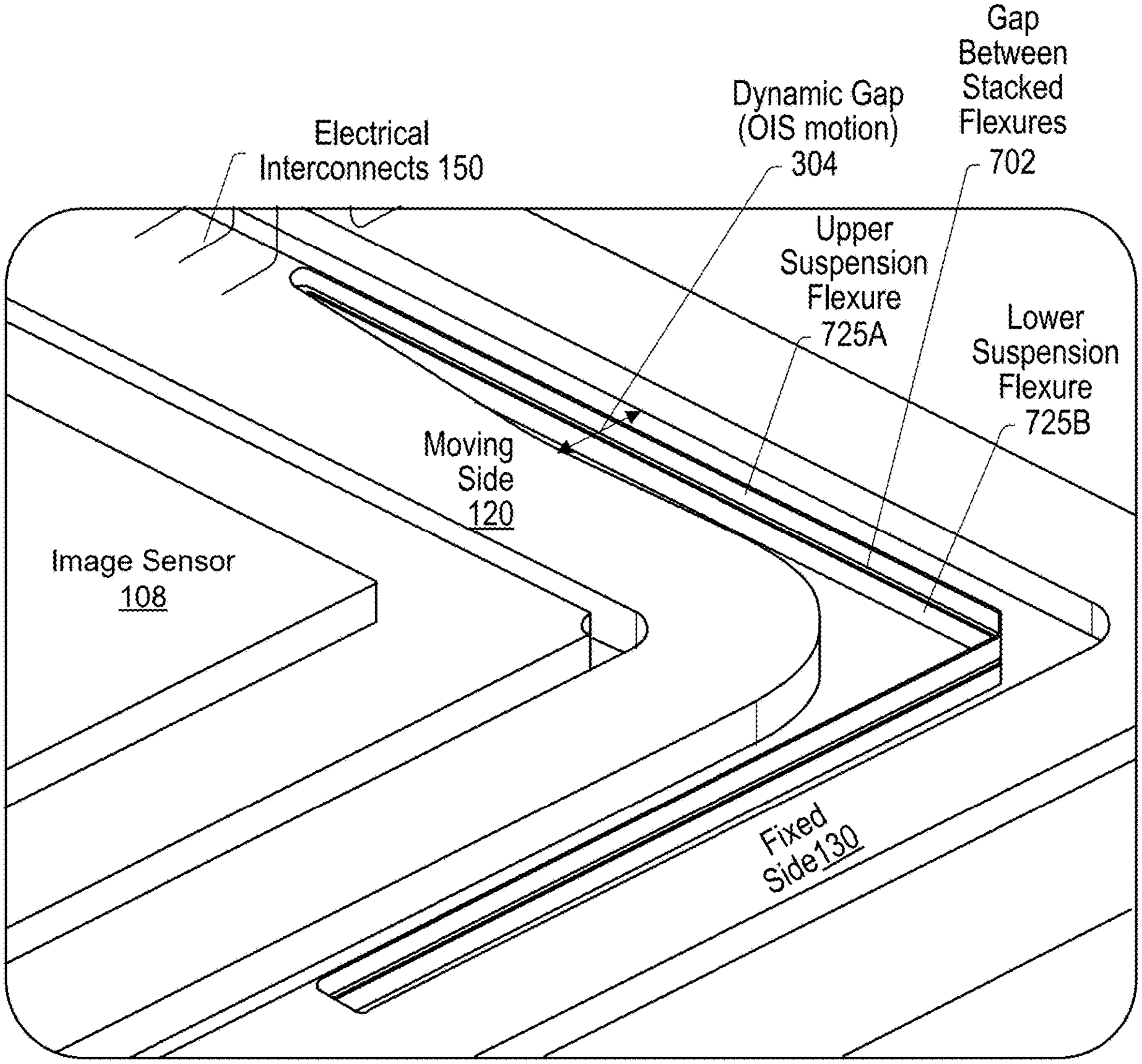
FIG. 7 shows example dynamic electrical interconnects with separate suspension architecture for sensor shift cameras, according to some embodiments.

FIG. 7 shows example dynamic electrical interconnects 150 with a separate suspension architecture for sensor shift cameras in example cameras, according to some embodiments. FIG. 7 illustrates an architecture that, while similar to that in FIGS. 5A/5B and 6, illustrates two stacked flexures per each corner. Like the flexures described in the description of FIG. 6, the stacked flexures in FIG. 7 may be used to route power and/or ground electrical connections between fixed side 130 and moving side 120 (not illustrated). FIG. 7 illustrates image sensor 108 attached to moving side 120 connected to the fixed side 130 via a stacked pair of flexures (upper suspension flexure 725A, lower suspension flexure 725B) with a gap 702 between the stacked flexure pair. Electrical interconnects 150, physically separate from the flexure pair and configured to carry high speed data signals from the image sensor 108, are illustrated as spanning the gap 702 between the fixed side 130 and the moving side 120.

FIGS. 8-11 illustrate various embodiments of a flexure component 810, usable in conjunction with, or in place of, interconnects 150. For example, a consumer electronics devices may include one camera that uses one or more flexure components, and another camera that uses interconnects

Flexure Component

At least some embodiments herein describe multiple techniques for electrically connecting two components of a consumer electronics device such as electrically connecting an electronic packaging to a silicon device. Some techniques for fabricating some such consumer electronics devices include use of wire bonds and flip chip. Some designs utilize long copper-based flexures to connect the static component to the moving component (e.g., an image sensor or similar). The flexures may be manufactured using a masked-based deposition process for the forming the dielectric as well as an additive process to form the copper traces for the electrical signals, for example. A limitation of some such designs is that a significant distance (150 microns or greater) may be required between the individual etched flexures to allow the uniform flow of etchant during the manufacturing process. Overall, this can result in 1-2 mm of additional space to accommodate the sensor shift flexures and increases the size of the camera module. In comparison, in at least some embodiments herein, distance between neighboring ones of the individual ones of the plurality of flexible arms is less than 150 microns.

In some embodiments of sensor shift cameras, electrical interconnects may run along and be one with various suspension components (a single component performing two functions: suspension and electrical connection). However, components with such combined functionality may have manufacturing limitations and/or miniaturization restrictions. Embodiments that separate suspension and electrical interconnection functionality may have benefits such as improved manufacturability, increased miniaturization, and/or improved performance, etc. For example, electrical interconnects that do perform double-duty as suspension components are necessarily thicker to have appropriate stiffness and mechanical stress properties for the suspension functionality and require wider tolerances for the etching fluid to flow during manufacture. Electrical interconnects that do not have to perform double-duty as suspension components (at least some types of which are referred to as arms of a flexure component, herein) can be thinner (due to reduced stiffness properties) and thus manufactured with closer tolerances (closer together) via an additive process because the thinner interconnects have reduced etching constraints during manufacture.

For example, a camera may include an actuator module for an image sensor and may include a moveable platform attached to an image sensor. The image sensor is configured to receive light refracted by lense(s) and to produce image data signals. The actuator may include a static portion that does not move relative to the moveable portion. A suspension may connect the static portion and the moveable platform and support movement of the moveable platform for image stabilization and/or for autofocus, for example. In embodiments, one or more actuators actuate movement of the moveable platform for image stabilization and/or for autofocus. Embodiments may include one or more flexure components and the flexure component(s) may include a first bar attached to the moveable platform, a second bar attached to the static portion, and numerous pattern-shaped flexible arms connecting the first and second bars of the flexure component. The pattern-shaped flexible arms may be constructed to move together in response to movement of the moveable platform relative to the static platform such that the pattern-shaped flexible arms move together in a deterministic manner (e.g., to avoid contact between the pattern-shaped flexible arms during movement of the moveable platform). One, some, or all of the pattern-shaped flexible arms of the flexure components may be constructed to route the image data signals, produced by the image sensor, from the moveable platform to the static portion, in various embodiments. In some embodiments, the pattern-shaped flexible arms are shaped to flex in a deterministic manner when the first or second bar moves relative to the other such that the pattern-shaped flexible arms avoid contact with one another throughout a range of motion comprising at least the range of motion of the moveable platform with respect to the static portion. For example, the range of motion of the moveable platform with respect to the static portion may be defined by one or more end stops of the actuator module or camera.

Figure 8:
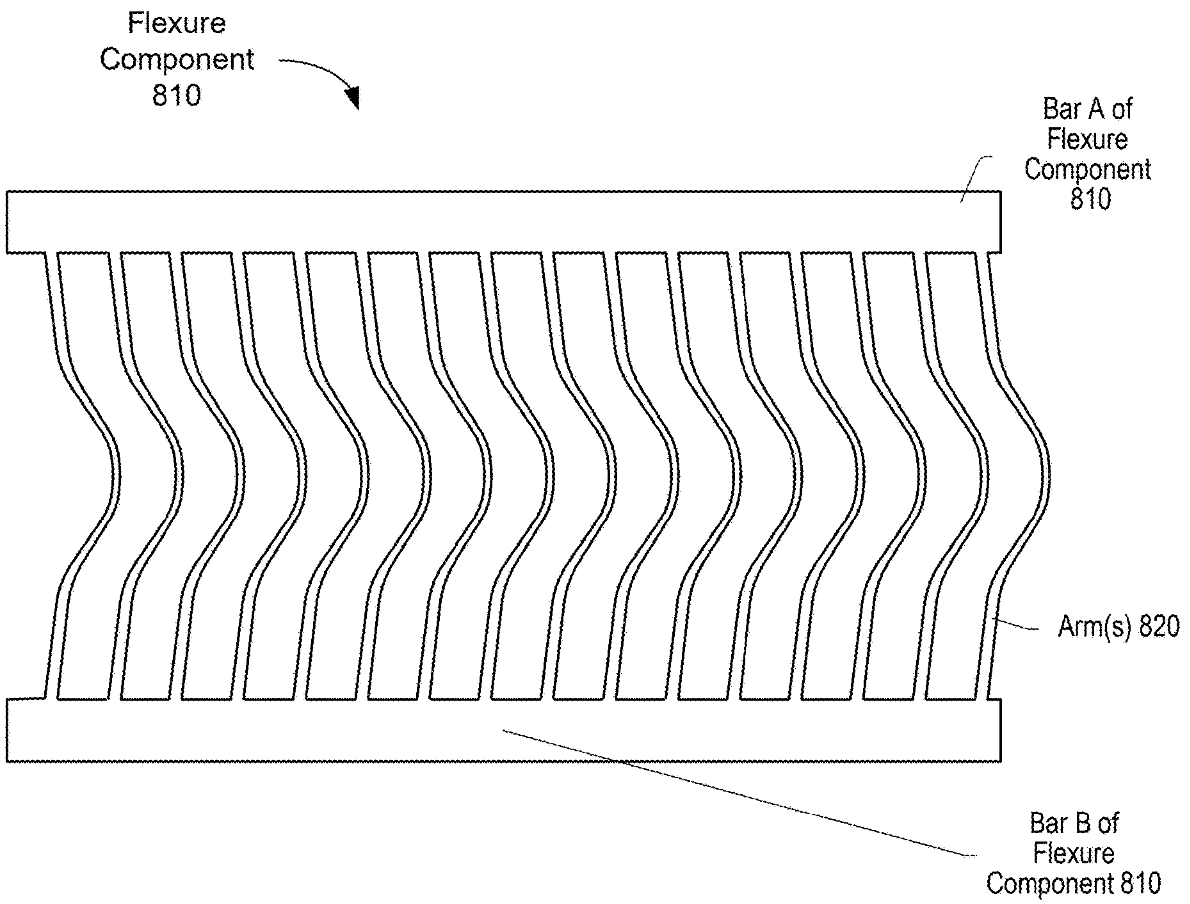
FIG. 8 illustrates top down view of a flexure component with numerous individual arms for carrying electrical signals between components electrically coupled to the bars of the flexure component, according to some embodiments.
Figure 9:
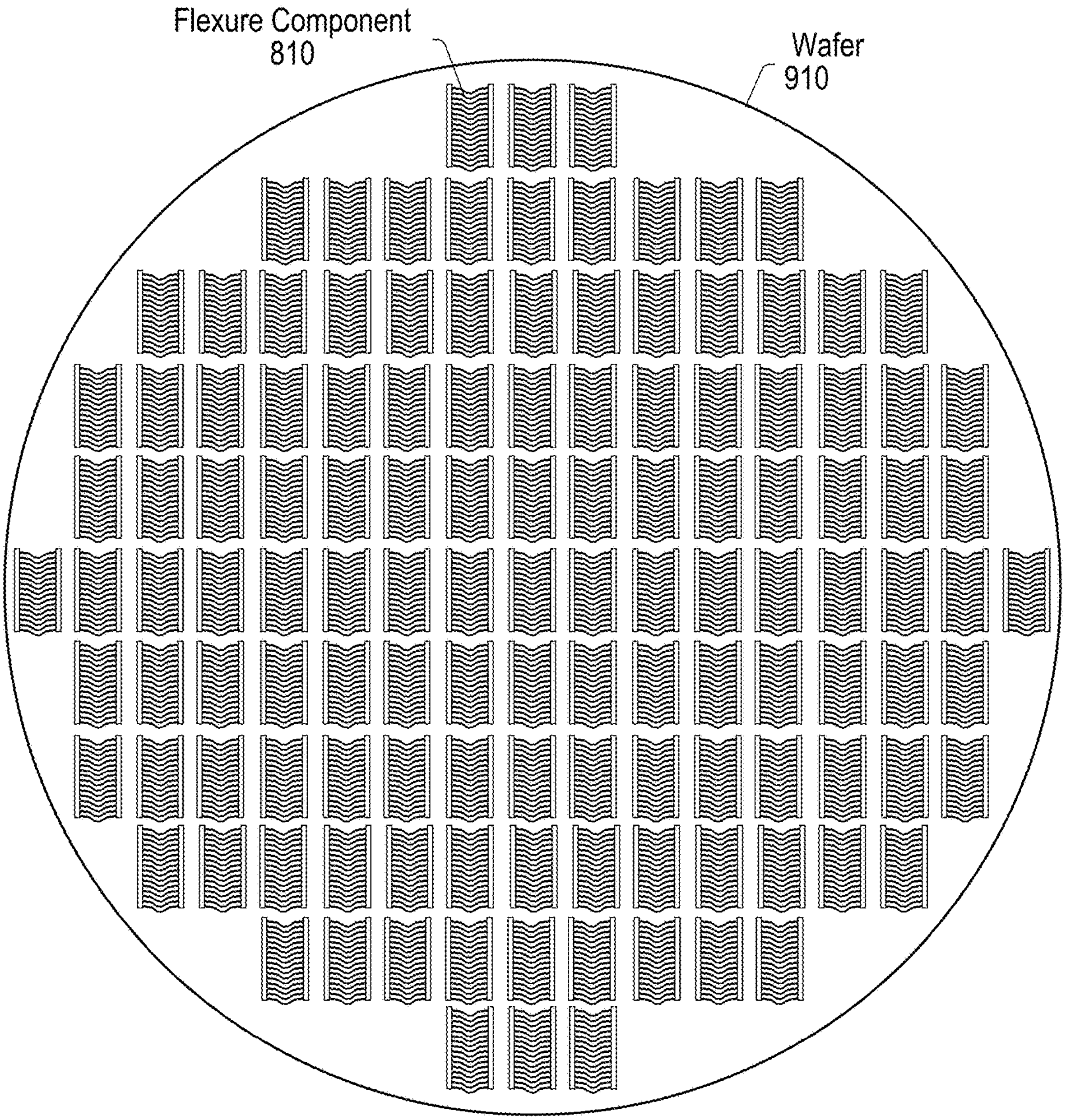
FIG. 9 illustrates an example wafer layout for manufacturing a set of flexure components at once, according to some embodiments.

FIG. 8 illustrates an embodiment of a flexure component 810 with numerous individual arms 820 that span between, and are for carrying electrical signals between, sides (e.g., bars A and B, sometimes referred to as rails A and B) of the flexure component 810. Such a flexure component 810 may be used between static and moving parts, such as between static and moving parts of a sensor-shift module, or any other electronic device with moving components. In some embodiments, the flexure component may be used between two static components or between two moving components. In embodiments, the bars may serve as mounting portions A and B for attaching the flexure component to respective moving and static components (e.g., coupling electrical features of the components). In embodiments, the flexure component 810 may be manufactured in a flat profile, as shown in FIGS. 8 and 9 (e.g., using one or more additive processes either on a wafer or sheet format, illustrated in FIG. 9, described below) and then installed in a three-dimensional arrangement (e.g., where the arms bend up or down in Z or other dimension). Manufacturing of a flexure component 810, including a large number of flexure components at once can reduce manufacturing time, in embodiments.

For example, FIG. 9 illustrates an embodiment of an example wafer layout for manufacturing the flexure component 810 illustrated in FIG. 8. In the illustrated embodiment, numerous flexure components 810 (flexure component 810 of a same type/shape, in some embodiments) for a number of devices are manufactured from a single wafer. Such a manufacturing process can be advantageous over a process used to manufacture the double-duty interconnects (interconnects that function both as a suspension and as electrical connections, where the suspension pieces for all four sides must be manufactured at once and in positional relationship to each other). The process that builds the double-duty interconnects may build the interconnects oriented in relationship to a location of an image sensor that will be supported (necessarily leaving, during manufacture, unused/wasted wafer material in the location where the image sensor will be). In contrast such a manufacturing process as illustrated with regard to FIG. 9 improves the used density of the wafer, reducing waste and increasing the number of flexure components 810 that can be produced in a given amount of time, as the individual flexure components 810 can be oriented to make maximum use of the space, without having to be oriented with regard to an image sensor to which the flexure component 810 will be attached. Additionally, wafer-based manufacturing processes may have the advantage of producing flexure components 810 with arms 820 that are closer together (e.g., compared to an etching manufacturing process), thereby improving miniaturization and contributing to a smaller overall device. It is contemplated that semiconductor-type processes (wafer and sputter deposition of traces or the like) or other process (roll-to-roll sheet with growing/plating of a conductor) may be used in manufacturing such flexure components 810, In at least some embodiments, a same version of flexure component 810 may be used on each side of a square image sensor, reducing the number of different parts needed to build the device.

Figure 10A:
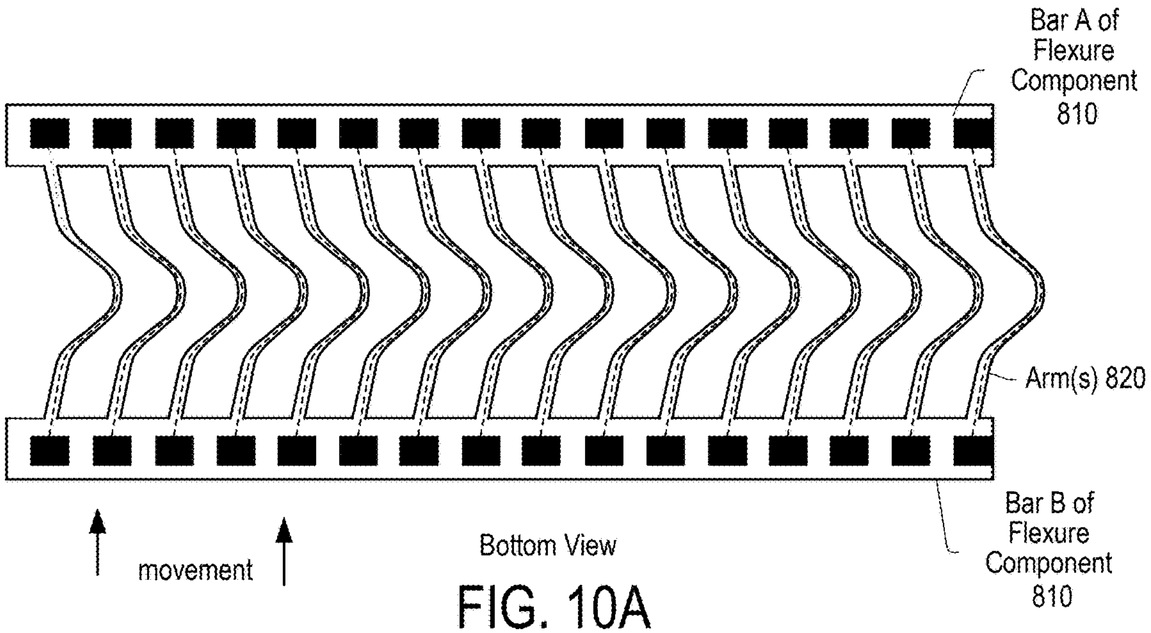
FIGS. 10A/10B illustrate bottom-up views of a patterned shape of arms that causes the arms of a flexure component to maintain a desired separation from one another when one or more of the bars between which the arms span, is displaced, in accordance with some embodiments.

FIG. 10A illustrates a view of an underside of an embodiment where a patterned, non-linear shape (e.g., a radius or other serpentine shape with one or more curves in the same or different directions as one another) allows the individual arms 820 to conform to a non-interfering shape (the arms do not touch) when displaced, reducing the amount of necessary spacing between individual arms 820 without producing contact. For example, in embodiments where the individual arms 820 run straight (not illustrated) and one side is brought closer to the other, the arms bend or buckle in unpredictable (non-deterministic) directions, and may contact one another. But, in embodiments where the individual arms 820 are curved or have other shape (illustrated) and one side is brought closer to the other, the arms 820 bend in predictable (deterministic) directions according to the shape, and do not contact one another during the movement. In embodiments, the pattern may be symmetrical (illustrated) or asymmetrical (not illustrated). In embodiments, the pattern-shaped flexible arms are shaped to flex in a deterministic manner when the first or second bar moves relative to the other such that the pattern-shaped flexible arms avoid contact with one another throughout a range of motion comprising at least the range of motion of the moveable platform with respect to the static portion (e.g., a range of motion having at least a range defined by the range of intended or possible movement between components electrically connected via the flexure component 810). In some embodiments, the range of motion of the moveable platform with respect to the static portion (and the corresponding minimum range of motion of the flexure component 810) is defined by one or more end stops defining the range of motion between the moveable and static portions.

In the illustrated embodiment, the lower bar B in the bottom view FIG. 10A moves toward bar A of flexure component 810. As bar B moves towards bar A, the central bends of the individual arms 820 shift right, due to the non-perpendicular attachment of the arms 820 to the bars A/B. In embodiments, the arms 820 stay substantially parallel (e.g., the central bends generally maintain their distance from one another) through at least a first range of motion as the central portion of the group of arms of the flexure component shift right.

Figure 10B:
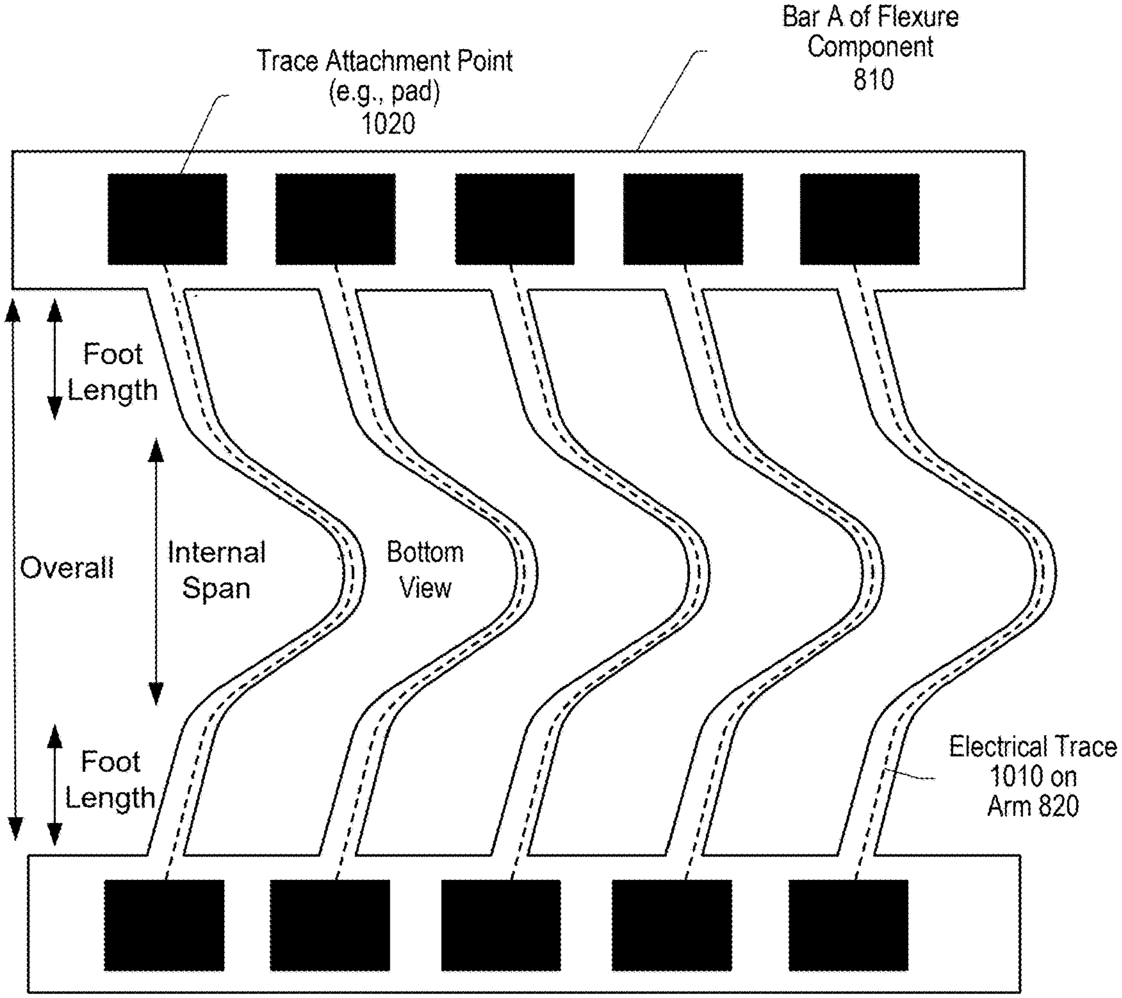
FIGS. 10C/10D/10E illustrate cross-sections of embodiments of arms of flexure components, in accordance with some embodiments.

In embodiments, in response to movement of the moveable platform, the plurality of flexible arms move together in a deterministic manner based on a non-linear shape of the flexible arms. For example, FIG. 10B illustrates arms 820 attached to Bars A and B at an angle, such that the arms attach at something other than a right angle (although embodiments, where the arms 820 attach at right angles to the bars A and B are contemplated). FIG. 10B illustrates that each end of the arms 820 are formed linearly for some distance from the attachment points to the bars A/B and then bend in a first arc towards one direction. After the first arc, the arms continue, formed in a straight line for some distance and then meet at another bend somewhat central to each arm 820. Various different shapes are contemplated that facilitate deterministic movement of the arms 820 over a range of motion. It is contemplated that various embodiments may have more or fewer bends, of increasing or decreasing radius. In embodiments, a bend in one direction may be followed by another bend in the same direction, in some embodiments, FIG. 10B illustrates a higher detail view of an underside of flexure component 810, illustrating traces 1010 along the arms 820 of the flexure component 810 that terminate at trace attachments points 1020 (e.g., pads designed to make electrical connections). Various techniques of electrically coupling the trace attachment points 1020 that terminate the traces 1010 to conductive features of components coupled to the moving (e.g., the image sensor side) and stationary sides (the stationary portion of the device side) of the flexure component 810 are contemplated. For example, trace attachment point 1020 may be attached to a conductive component via soldering (via soldering of pads or otherwise), flip chip (controlled collapse chip connection (C4)), ultrasonic bonding, conductive adhesive, ACF (Anisotropic Conductive Film), wire bonding, etc., or combinations thereof. It is contemplated that in at least some embodiments, one or more of the arms may not have a respective trace, and/or that different arms may have one or more traces than another arm, etc. For example, individual ones of the pattern-shaped flexible arms may include a plurality of electrical traces, including one or more traces configured as a ground or power trace, and one or more traces configured as electrical signal carrying traces (e.g., to carry signals from an image sensor).

FIG. 10B illustrates that flexure component 810 has individual electrical traces 1010 on arms 820. Embodiments of individual arms 820 each having more than one trace 1010 (e.g., separated by a dielectric) are contemplated. Additional traces 1010 may be arranged side by side on the arms 820 (e.g., separated by a dielectric) or top and bottom of the arm 820 (again, separated by a dielectric), for example, or various combinations thereof, in various embodiments. In an example embodiment, a single arm 820 of flexure component 810 may include two side by side traces and a ground trace, such as for, but not necessarily limited to, high speed signaling.

It is contemplated that in some embodiments, the arms 820 of flexure component 810 may be used to transport signals (e.g., high speed image signals from an image sensor) while other electrical connectors (e.g., traces routed along suspension components, etc.) may be used to supply power (e.g., to an image sensor or other power-consuming component).

In embodiments, the conductive core(s) 1060 of the arms 820 meet with the trace attachment point(s) 1020 at vias.

Figure 10C:
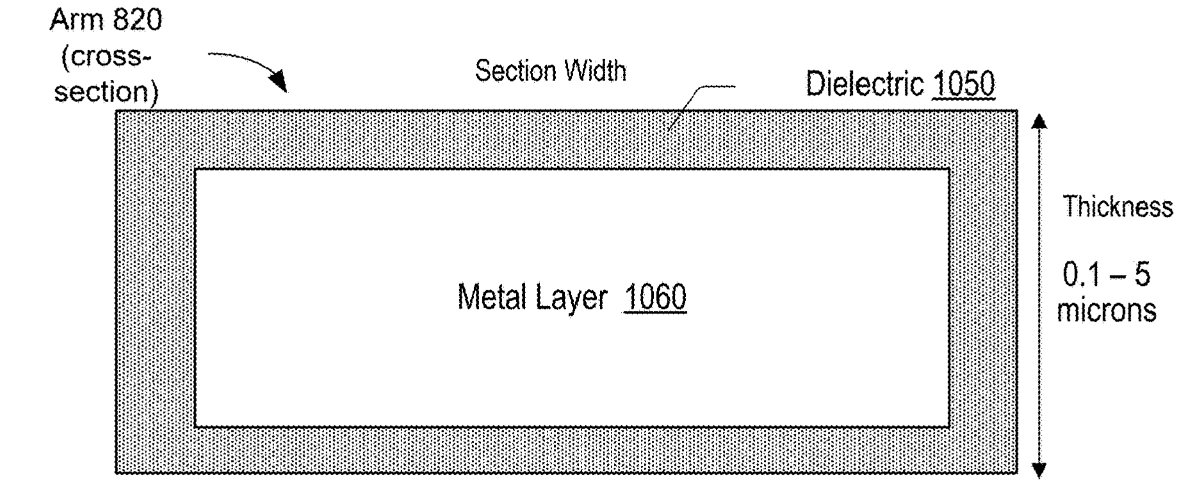

FIG. 10C illustrates a cross-section view of a stack design of materials used in manufacturing arm 820 of flexure component 810. The stack design can be critical to the functioning of the device. For example, attributes of the materials as well as thickness and arrangement thereof may contribute to the mechanical robustness of the device. In embodiments, components should be mechanically robust for the device to function correctly, but have a stiffness value such that an actuator can move the moving component (e.g., an image sensor, etc.) for example. In the illustrated embodiment, a proposed stack has a metal layer 1060 deposited in-between the dielectric 1050. It is contemplated that such an architecture may have an overall height not exceeding 0.1-0.5 microns. In embodiments, the stack design illustrated in FIG. 10C may be applied in various combinations with many different interconnect designs herein (e.g., FIGS. 1A/B-4C, 5A/B, 6 and 7, etc.), including but not limited to the flexure component designs in FIGS. 8-12.

In embodiments, the arm 820 maybe manufactured such that a thickness of the arm 820 (e.g., less than 0.5 micron) causes the stiffness of the individual flexures (a stiffness that is already lower than thicker designs) to be far greater than the mass of the individual flexures, compared to prior designs having greater thickness. Such arm designs (designs having a greater stiffness to mass ratio) may have improved inertial loading characteristics. For example, reduced mass improves performance of the mechanism during a drop event (less inertia in rapid acceleration/deceleration).

Figure 10D:
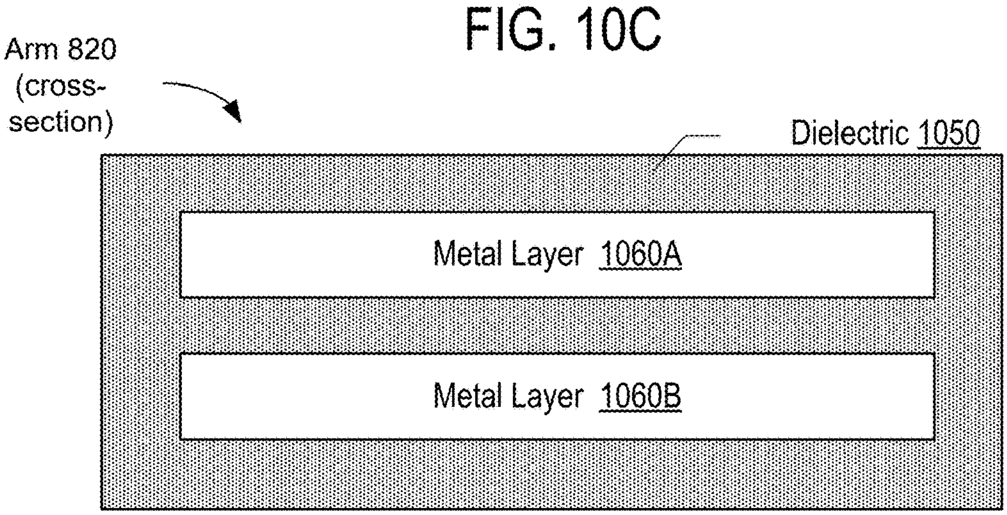

FIG. 10D illustrates a cross-section of embodiments of an arm of flexure component 810, in accordance with some embodiments. In FIG. 10D two metal layers 1060A and 1060B are illustrated in a stacked formation, with dielectric 1050 surrounding the two metal layers 1060A and 1060B and in-between the two metal layers 1060A and 1060B.

Figure 10E:
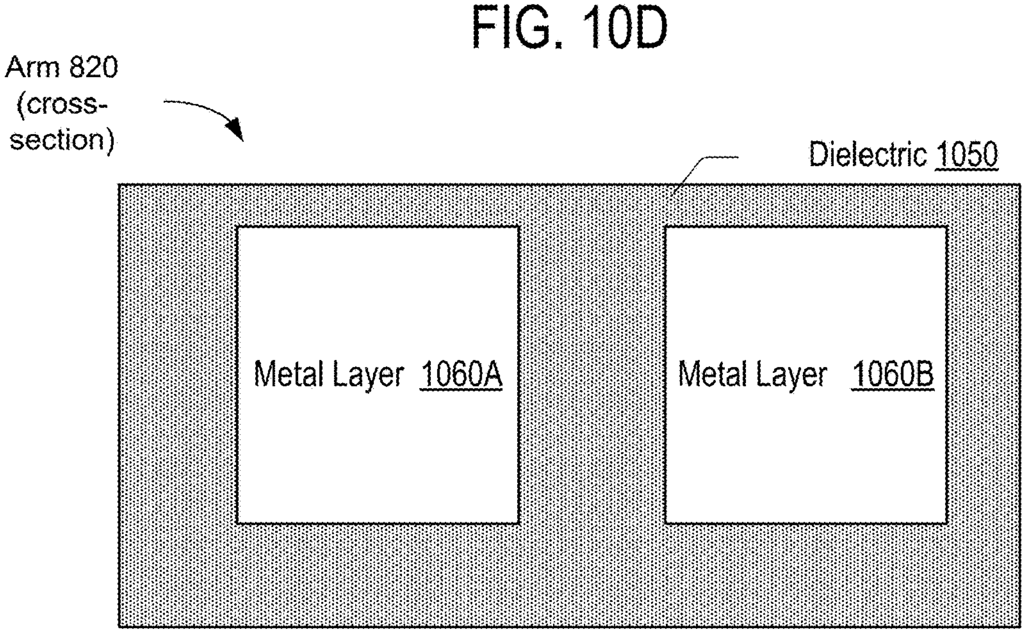

FIG. 10E illustrates a cross-section of embodiments of an arm of flexure component 810, in accordance with some embodiments. In FIG. 10E two metal layers 1060A and 1060B are illustrated in a side-by-side formation, with dielectric 1050 surrounding the two metal layers 1060A and 1060B and in-between the two metal layers 1060A and 1060B.

In embodiments, a cross section design of the arms may be adjusted to increase or decrease stiffness in intended and/or unintended directions of movement. For example, at least some embodiments herein are characterized by low stiffness in any of up to 6 degrees of movement (three translational (X, Y, and Z) and three rotational coordinates (rotation about X, Y, and Z)) while still avoiding contact during movement. At least some embodiments herein may be characterized by low stiffness in one or more directions of intended motion, such as but not limited to rotational stiffness (e.g., for designs where a component such as an image sensor is intended to tilt, to correct for manufacturing variances or the like, etc.) while exhibiting greater stiffness in another direction of motion (such as but not limited to an unintended direction of motion). At least some embodiments herein increase the degrees of freedom of movement for components attached via the flexure component. In embodiments, the pattern-shaped arms are shaped to flex in a deterministic manner (vs. non-shaped arms that bend in random/pseudorandom directions more likely to physically contact one another and require more distance between one another) when the first or second bar moves relative to the other, such that the pattern-shaped arms avoid contact with one another throughout a range of motion. In embodiments, the pattern-shaped arms remain parallel to one another (e.g., along their length) throughout the range of motion, or remain in a three dimensional relationship to one another throughout the range of motion. For example, the arms may remain substantially parallel along one or more planes (e.g., in three-dimensional space) by moving in a deterministic manner and not contacting one another over an operational range of motion for the device.

In some embodiments, an individual arm 820 of a flexure component may have a thickness (see FIG. 10C) less than or equal to 3 micron, a section width (see FIG. 10C) less than or equal to 6 micron, and/or foot length(s) (see FIG. 10B) greater than or equal 50 micron. In some embodiments, an individual arm 820 of a flexure component may have one or more bends (e.g. feet radius) with a radius greater than or equal to 120 micron. In some embodiments, an individual arm 820 of a flexure component may have a total height less than or equal to 500 micron. In some embodiments, an individual arm 820 of a flexure component may have an internal span less than or equal to 500 micron.

In some embodiments, an individual arm 820 of a flexure component may have a thickness less than or equal to 2 micron, a section width less than or equal to 5 micron, and/or an overall length greater than or equal 10 micron. In some embodiments, an individual arm 820 of a flexure component may have one or more bends (e.g., feet radius) with a radius greater than or equal to 90 micron. In some embodiments, an individual arm 820 of a component may have a total height less than or equal to 510 micron.

In embodiments, individual arms may be manufactured to exhibit particular stiffness characteristics in any of X, Y, or Z dimensions. In some embodiments the arms may be manufactured to have X stiffness of 0.014-0.020 newton-meters (Nm)/mm. In some embodiments the arms may be manufactured to have Y stiffness of 0.003-0.004 newton-meters (Nm)/mm. In some embodiments the arms may be manufactured to have Z stiffness of 0.006-0.007 newton-meters (Nm)/mm.

In some embodiments, an electrical interconnect 150 (e.g., FIGS. 1A/B-7) may have one or more of the characteristics described above for the individual arms 820 of the flexure component.

Figure 11:
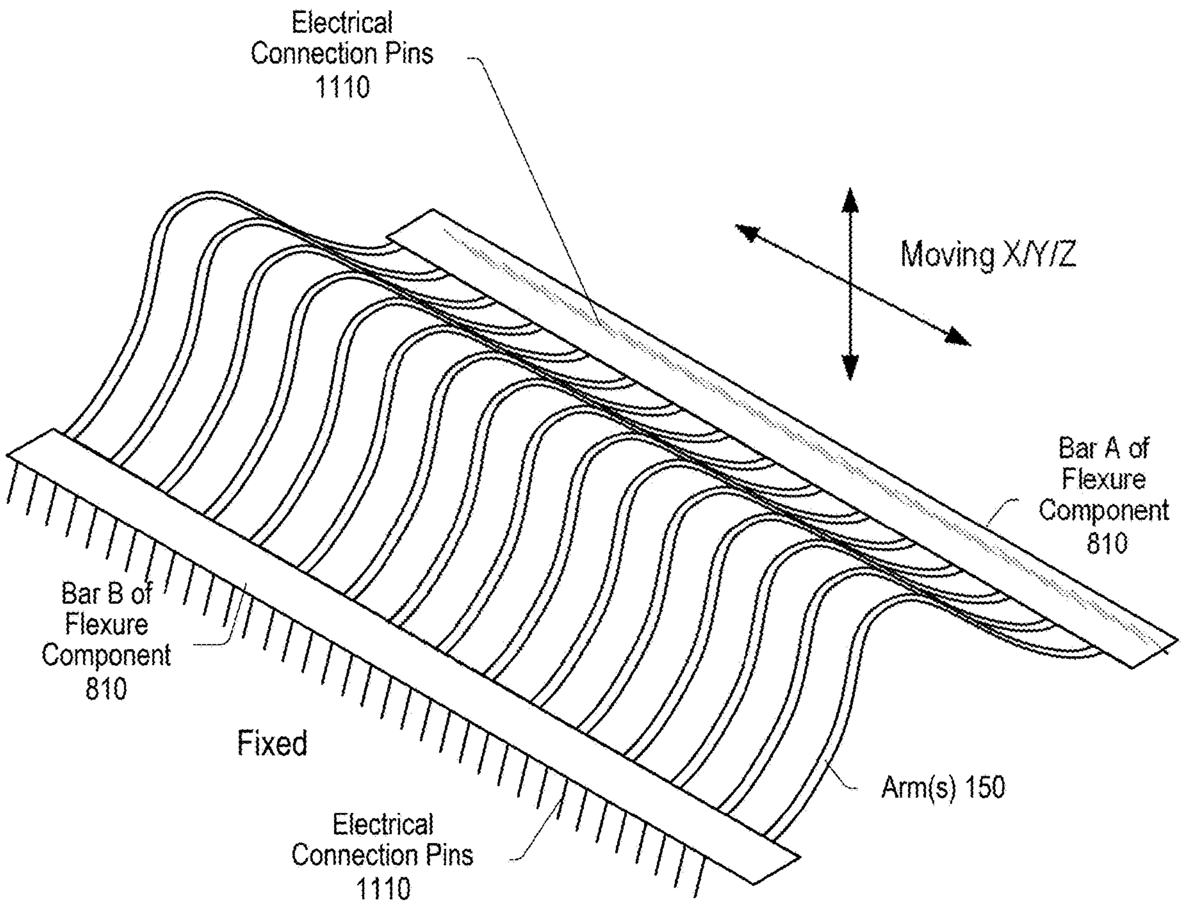
FIG. 11 illustrates a non-linear patterned shape that allows displacement in at least X/Y/Z when one bar of a flexure component is fixed, and the other bar is moved, according to some embodiments.

FIG. 11 illustrates that a patterned shape may allow displacement in the X/Y/Z directions when one side is fixed, and the other side is moved in the X/Y/Z directions. Again, the shape of the arms may allow the individual arms to deterministically conform to the required shape when displaced, avoiding contact between the conductive arms. Flexure component 810 is illustrated with electrical connection pins 1110 (in place of or in combination with trace attachment point pads 1020, in FIGS. 10A-B).

Figure 12:
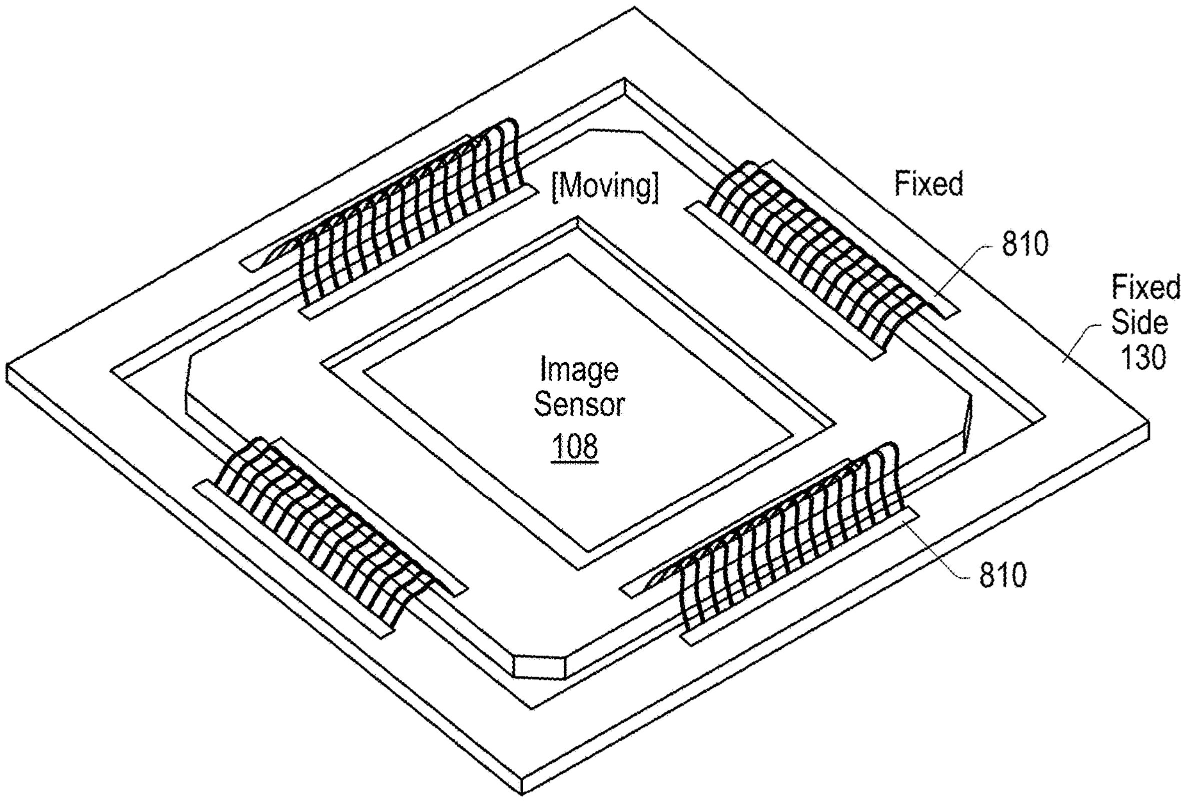
FIG. 12 illustrates four interconnects attached to a fixed outer frame and an inner moving portion.

FIG. 12 illustrates four distinct flexure components each attached to a fixed outer frame and the inner moving portion of a discontinuous architecture. The attachment of the flexure component(s) may be made by several different methods, including but not limited to solder, flip chip, conductive adhesive, Anisotropic Conductive Film (ACF), or wire bond, etc. In the illustrated embodiment, four discrete flexure components 810 connect electrical connections of the image sensor 108 of the moveable portion to electrical connections on the fixed side 130, each flexure component 810 located on a respective side of the image sensor 108. In embodiments, the image sensor 108 and the fixed side 130 may be electrically connected via one or more flexure components that do not span a perimeter of the image sensor (e.g., flexure components made for such a design may reduce unused space on the wafer 910 in FIG. 9). In embodiments, the one or more flexure components 810 are distinct from all of the suspensions components between the static platform 130 and the moveable platform 120.

Figure 13:
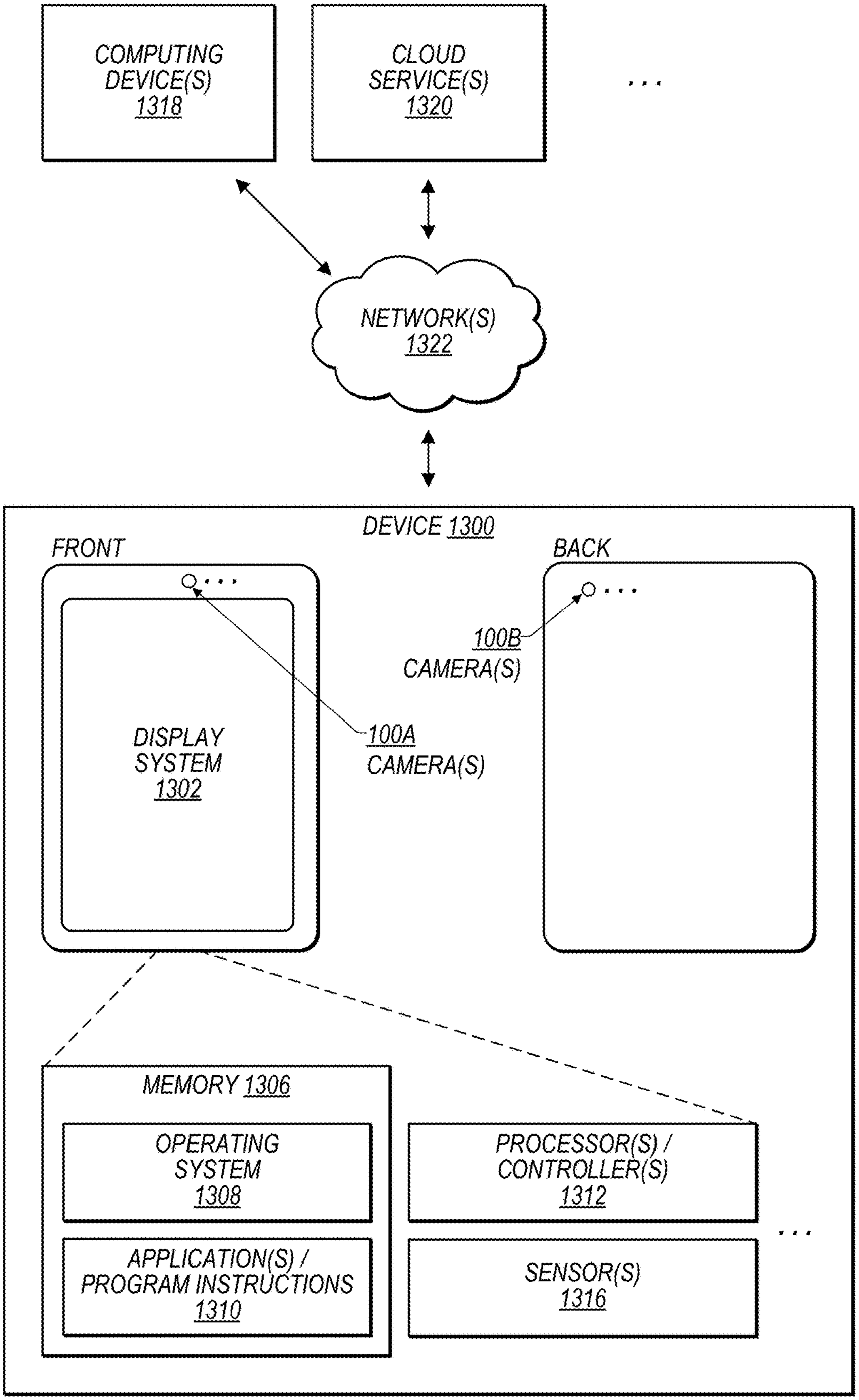
FIG. 13 shows a schematic representation of an example device that may include a camera having dynamic electrical interconnects with separate suspension architecture, according to some embodiments.

FIG. 13 shows a schematic representation of an example device that may include a camera 100 having electrical interconnects, or one or more flexure components, separate from a suspension of the camera, for sensor shift cameras, according to some embodiments. In some embodiments, the device 1300 may be a mobile device and/or a multifunction device. In various embodiments, the device 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1300 may include a display system 1302 (e.g., comprising a display and/or a touch-sensitive surface) and/or one or more cameras 100. In some non-limiting embodiments, the display system 1302 and/or one or more front-facing cameras 100*a* may be provided at a front side of the device 1300, e.g., as indicated in FIG. 13. Additionally, or alternatively, one or more rear-facing cameras 100*b* may be provided at a rear side of the device 1300. In some embodiments comprising multiple cameras 100, some or all of the cameras may be the same as, or similar to, each other. Additionally, or alternatively, some or all of the cameras may be different from each other. In various embodiments, the location(s) and/or arrangement(s) of the camera(s) 100 may be different than those indicated in FIG. 13.

Among other things, the device 1300 may include memory 1306 (e.g., comprising an operating system 1308 and/or application(s)/program instructions 1310), one or more processors and/or controllers 1312 (e.g., comprising CPU(s), memory controller(s), display controller(s), and/or camera controller(s), etc.), and/or one or more sensors 1316 (e.g., orientation sensor(s), proximity sensor(s), and/or position sensor(s), etc.). In some embodiments, the device 1300 may communicate with one or more other devices and/or services, such as computing device(s) 1318, cloud service(s) 1320, etc., via one or more networks 1322. For example, the device 1300 may include a network interface (e.g., network interface 1310) that enables the device 1300 to transmit data to, and receive data from, the network(s) 1322. Additionally, or alternatively, the device 1300 may be capable of communicating with other devices via wireless communication using any of a variety of communications standards, protocols, and/or technologies.

Figure 14:
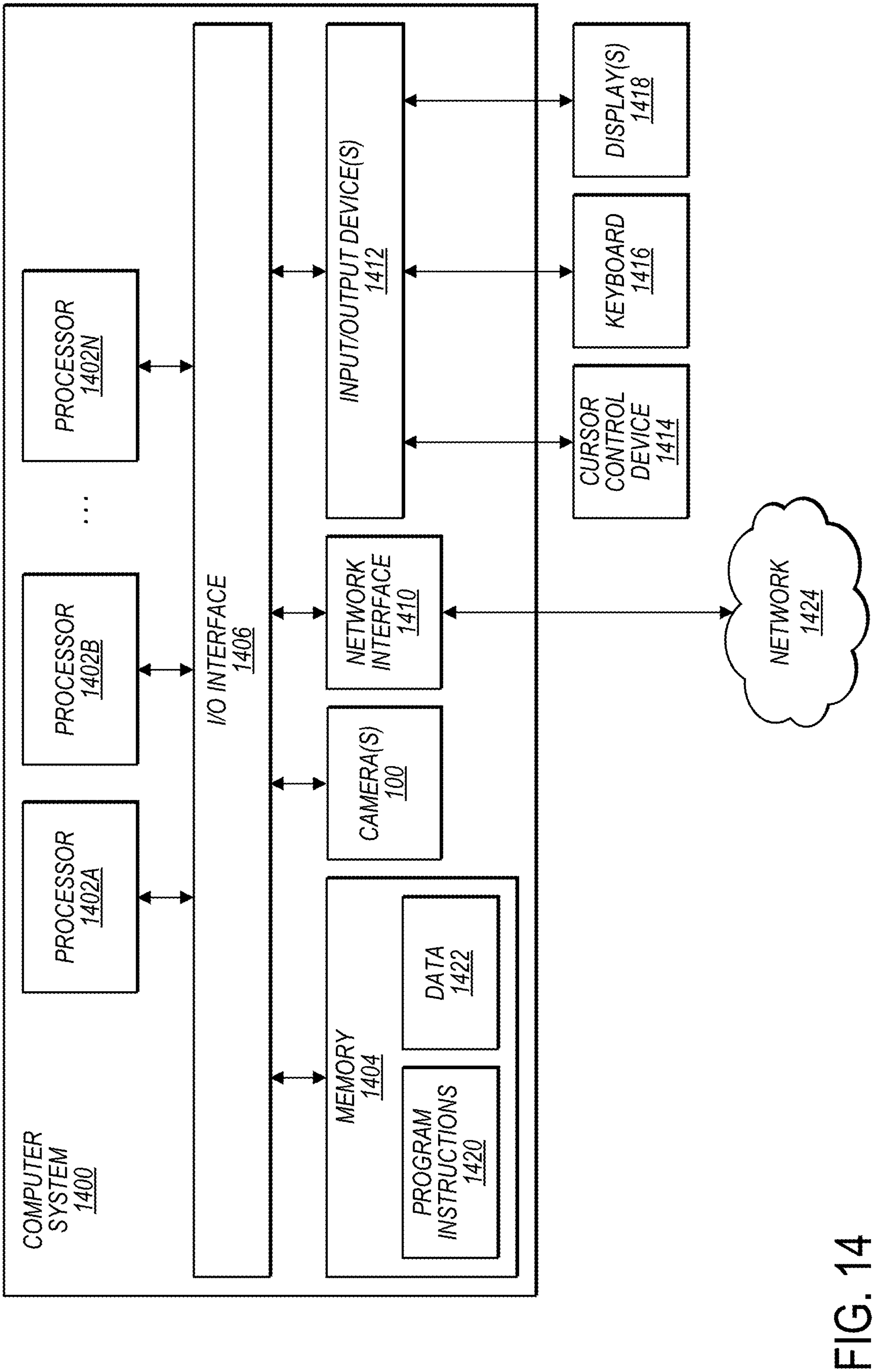
FIG. 14 shows a schematic block diagram of an example computer system that may include a camera having dynamic electrical interconnects with separate suspension architecture, according to some embodiments.

FIG. 14 shows a schematic block diagram of an example computer system that may include a camera having electrical interconnects, or flexure component, separate from a suspension of the camera, according to some embodiments. In addition, computer system 1400 may implement methods for controlling operations of the camera and/or for performing image processing images captured with the camera. In some embodiments, the device 1400 (described herein with reference to FIG. 13) may additionally, or alternatively, include some or all of the functional components of the computer system 1400 described herein.

The computer system 1400 may be configured to execute any or all of the embodiments described above. In different embodiments, computer system 1400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1400 includes one or more processors 1402 coupled to a system memory 1404 via an input/output (I/O) interface 1406. Computer system 1400 further includes one or more cameras 100 coupled to the I/O interface 1406. Computer system 1400 further includes a network interface 1410 coupled to I/O interface 1406, and one or more input/output devices 1412, such as cursor control device 1414, keyboard 1416, and display(s) 1418. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1402, or a multiprocessor system including several processors 1402 (e.g., two, four, eight, or another suitable number). Processors 1402 may be any suitable processor capable of executing instructions. For example, in various embodiments processors 1402 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 1402 may include additional types of processors, such as graphics processing units (GPUs), application specific integrated circuits (ASICs), etc. In multiprocessor systems, each of processors 1402 may commonly, but not necessarily, implement the same ISA. In some embodiments, computer system 1400 may be implemented as a system on a chip (SoC). For example, in some embodiments, processors 1402, memory 1404, I/O interface 1406 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1404 may be configured to store program instructions 1420 accessible by processor 1402. In various embodiments, system memory 1404 may be implemented using any suitable memory technology, such as static random-access memory (SRAM), synchronous dynamic RAM (SDRAM), nonvolatile/Flash-type memory, or any other type of memory. Additionally, existing camera control data 1422 of memory 1404 may include any of the information or data structures described above. In some embodiments, program instructions 1420 and/or data 1422 may be received, sent, or stored upon different types of computer-accessible media or on similar media separate from system memory 1404 or computer system 1400. In various embodiments, some or all of the functionality described herein may be implemented via such a computer system 1400.

In one embodiment, I/O interface 1406 may be configured to coordinate I/O traffic between processor 1402, system memory 1404, and any peripheral devices in the device, including network interface 1410 or other peripheral interfaces, such as input/output devices 1412. In some embodiments, I/O interface 1406 may perform any necessary protocol, timing, or other data transformations to convert data signals from one component (e.g., system memory 1404) into a format suitable for use by another component (e.g., processor 1402). In some embodiments, I/O interface 1406 may include support for devices attached through various types of peripheral buses, such as a variant of the Peripheral Component Interconnect (PCI) bus standard or the Universal Serial Bus (USB) standard, for example. In some embodiments, the function of I/O interface 1406 may be split into two or more separate components, such as a north bridge and a south bridge, for example. Also, in some embodiments some or all of the functionality of I/O interface 1406, such as an interface to system memory 1404, may be incorporated directly into processor 1402.

Network interface 1410 may be configured to allow data to be exchanged between computer system 1400 and other devices attached to a network 1424 (e.g., carrier or agent devices) or between nodes of computer system 1400. Network 1424 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1410 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1412 may, in some embodiments, include one or more display terminals, keyboards, keypads, touchpads, scanning devices, voice or optical recognition devices, or any other devices suitable for entering or accessing data by one or more computer systems 1400. Multiple input/output devices 1412 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1410.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An actuator module for an image sensor, comprising:

a moveable platform attached to an image sensor configured to receive light refracted by one or more lenses and to produce image data signals;

a static portion;

a suspension attached to the static portion and the moveable platform and configured to support movement of the moveable platform for image stabilization or for autofocus;

an actuator configured to actuate the movement of the moveable platform for image stabilization or for autofocus; and one or more flexure components, individually comprising:

a first bar attached to the moveable platform and a second bar attached to the static portion; and a plurality of pattern-shaped flexible arms connecting the first and second bars of the flexure component, wherein the pattern-shaped flexible arms are configured to move together in response to movement of the moveable platform relative to the static portion such that the pattern-shaped flexible arms move together in a deterministic manner to avoid contact between the pattern-shaped flexible arms during movement of the moveable platform;

wherein the first bar and the second bar serve as respective common mounting portions for attaching each of the plurality of pattern-shaped flexible arms of the flexure component to the moveable platform and the static portion; and wherein at least one of the plurality of pattern-shaped flexible arms of the one or more flexure components is configured to route the image data signals, produced by the image sensor, from the moveable platform to the static portion.

2. The actuator module for an image sensor of claim 1, wherein the pattern-shaped flexible arms are shaped to flex in a deterministic manner when the first or second bar moves relative to the other such that the pattern-shaped flexible arms avoid contact with one another throughout a range of motion comprising at least the range of motion of the moveable platform with respect to the static portion.

3. The actuator module for an image sensor of claim 2, wherein the range of motion of the moveable platform with respect to the static portion is defined by one or more end stops of the actuator module.

4. The actuator module for an image sensor of claim 1, wherein a distance between neighboring ones of the individual ones of the plurality of flexible arms is less than 150 microns.

5. The actuator module for an image sensor of claim 1, wherein individual ones of the plurality of flexible arms comprise a metal layer surrounded by a dielectric.

6. The actuator module for an image sensor of claim 1, wherein an overall height of a thickness of the individual ones of the plurality of flexible arms is equal to or less than 0.5 microns.

7. The actuator module for an image sensor of claim 1, wherein the one or more flexure components comprise four discrete flexure components, each flexure component located on a respective side of the image sensor.

8. A camera, comprising:
- one or more lenses;
- an image sensor configured to receive light refracted by the one or more lenses and to produce image data signals;
- a moveable platform attached to the image sensor configured to receive light refracted by the one or more lenses and to produce image data signals;
- a static portion;
- a suspension attached to the static portion and the moveable platform and configured to support movement of the moveable platform for image stabilization or for autofocus;
- an actuator configured to actuate the movement of the moveable platform for image stabilization or for autofocus; and
- one or more flexure components individually comprising:
  - a first bar attached to the moveable platform and a second bar attached to the static portion; and
  - a plurality of pattern-shaped flexible arms connecting the first and second bars of the flexure component, wherein the pattern-shaped flexible arms are configured to move together in response to movement of the moveable platform relative to the static portion such that the pattern-shaped flexible arms move together in a deterministic manner to avoid contact between the pattern-shaped flexible arms during movement of the moveable platform;
  - wherein the first bar and the second bar serve as respective common mounting portions for attaching each of the plurality of pattern-shaped flexible arms of the flexure component to the moveable platform and the static portion; and
  - wherein at least one of the plurality of pattern-shaped flexible arms of the one or more flexure components is configured to route the image data signals, produced by the image sensor, from the moveable platform to the static portion.

9. The camera of claim 8, wherein the pattern-shaped flexible arms are shaped to flex in a deterministic manner when the first or second bar moves relative to the other such that the pattern-shaped flexible arms avoid contact with one another throughout a range of motion comprising at least the range of motion of the moveable platform with respect to the static portion.

10. The camera of claim 9, wherein the range of motion of the moveable platform with respect to the static portion is defined by one or more end stops of the camera.

11. The camera of claim 10, wherein the pattern-shaped flexible arms are shaped to flex in a deterministic manner when the first or second bar moves in any of five degrees of freedom relative to the other such that the pattern-shaped flexible arms avoid contact with one another throughout a range of motion comprising at least the range of motion of the moveable platform with respect to the static portion, at least partially defined by one or more end stops.

12. The camera of claim 8, wherein the one or more flexure components are distinct from the suspension between the static portion and the moveable portion.

13. The camera of claim 8, wherein:
- a distance between neighboring ones of the individual ones of the plurality of flexible arms is less than 150 microns; and
- an overall height of a thickness of the individual ones of the plurality of flexible arms is equal to or less than 0.5 microns.

14. The camera of claim 8, wherein the one or more flexure components comprise a flexure component that does not span a perimeter of the image sensor.

15. A flexure component, comprising:
- a first bar;
- a second bar coupled to the first bar via a plurality of pattern-shaped flexible arms; and
- the plurality of pattern-shaped flexible arms connecting the first and second bars of the flexure component, wherein the pattern-shaped flexible arms are configured to move together in response to movement of the first bar with respect to the second bar such that the pattern-shaped flexible arms move together in a deterministic manner to avoid contact between the pattern-shaped flexible arms during movement of the first bar, wherein the first bar and the second bar serve as common mounting portions for attaching each of the plurality of pattern-shaped flexible arms to respective portions of a device, and wherein at least one of the plurality of pattern-shaped flexible arms between the first and second bars of the flexure component is configured to route electrical signals between the first and second bars.

16. The flexure component of claim 15, wherein the pattern-shaped flexible arms are shaped to flex in a deterministic manner when the first or second bar moves relative to the other such that the pattern-shaped flexible arms avoid contact with one another throughout a range of motion.

17. The flexure component of claim 16, wherein the pattern-shaped flexible arms:
- remain parallel to one another throughout the range of motion; or
- remain in a three-dimensional relationship to one another throughout the range of motion.

18. The flexure component of claim 15, wherein the pattern-shaped flexible arms comprise a plurality of electrical traces comprising:
- one or more traces configured as a ground or power trace; and
- one or more traces configured as electrical signal carrying traces.

19. The flexure component of claim 15, wherein individual ones of the plurality of flexible arms comprise one or more individual conductors surrounded by dielectric.

20. The flexure component of claim 15, wherein:
- a distance between neighboring ones of the individual ones of the plurality of flexible arms is less than 150 microns; and
- an overall height of a thickness of the individual ones of the plurality of flexible arms is equal to or less than 0.5 microns.

* * * * *